(12) United States Patent
Deymier et al.

(10) Patent No.: US 11,017,756 B2
(45) Date of Patent: May 25, 2021

(54) PHONONIC SYSTEM TO ACHIEVE QUANTUM-ANALOGUE PHASE-BASED UNITARY OPERATIONS

(71) Applicant: Arizona Board of Regents on Behalf of the University of Arizona, Tucson, AZ (US)

(72) Inventors: Pierre A. Deymier, Tucson, AZ (US); Keith A. Runge, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 16/755,693

(22) PCT Filed: Oct. 10, 2018

(86) PCT No.: PCT/US2018/055241
§ 371 (c)(1),
(2) Date: Apr. 13, 2020

(87) PCT Pub. No.: WO2019/075085
PCT Pub. Date: Apr. 18, 2019

(65) Prior Publication Data
US 2020/0388263 A1    Dec. 10, 2020

Related U.S. Application Data

(60) Provisional application No. 62/571,481, filed on Oct. 12, 2017.

(51) Int. Cl.
*B82Y 30/00* (2011.01)
*G10K 11/04* (2006.01)
(Continued)

(52) U.S. Cl.
CPC .............. *G10K 11/04* (2013.01); *B82B 3/00* (2013.01); *B82Y 10/00* (2013.01); *B82Y 40/00* (2013.01); *G01Q 80/00* (2013.01)

(58) Field of Classification Search
CPC .......... G10K 11/04; B82B 3/00; B82Y 40/00; B82Y 10/00; G01Q 80/00
See application file for complete search history.

(56) References Cited

U.S. PATENT DOCUMENTS

| | | | |
|---|---|---|---|
| 8,525,544 B2 * | 9/2013 | Wu .................... | B82Y 10/00 326/5 |
| 2019/0164531 A1 * | 5/2019 | Deymier .............. | G10K 11/26 |
| 2019/0266298 A1 * | 8/2019 | Deymier .............. | B82Y 10/00 |

OTHER PUBLICATIONS

Savin, AleksandrV., et al. "Nonlinear dynamics of zigzag molecular chains." Physics—uspekhi 42.3 (1999): 245. (Year: 1999).*

(Continued)

*Primary Examiner* — Wyatt A Stoffa
(74) *Attorney, Agent, or Firm* — Polsinelli PC

(57) ABSTRACT

Various embodiments of a phononic system to achieve quantum-analogue phase-based unitary operations are disclosed. A plurality of diatomic molecules is adsorbed on a cubic crystal surface. At least a first pair of parallel chains is created from the plurality of diatomic molecules, such that the two constituent chains of the first pair of parallel chains each comprise three or more diatomic molecules. One or more diatomic molecules of the first pair of parallel chains are displaced in order to thereby create one or more kinks in the first pair of parallel chains. The one or more kinks apply a first desired phase transformation to elastic waves scattered by the plurality of diatomic molecules and adjusting the number of kinks or adjusting the order in which kinks are created or modified causes a corresponding adjustment to the first desired phase transformation.

18 Claims, 14 Drawing Sheets

(51) Int. Cl.
  *G01Q 80/00*  (2010.01)
  *B82Y 10/00*  (2011.01)
  *B82Y 40/00*  (2011.01)
  *B82B 3/00*  (2006.01)

(56) References Cited

OTHER PUBLICATIONS

International Search Report and Written Opinion from PCT/US2018/055241 dated Dec. 31, 2018, 6 pages.

Somorjai et al., The reactivity of low index [(111) and (100)] and stepped platinum single crystal surfaces, Proceedings of the Royal Society A—Mathematical, Physical and Engineering Sciences, 1972, vol. 331, issue 1586, pp. 335-346; retrieved from the Internet: <DOI: 10.1098/rspa.1972.0181> see entire document, especially, p. 341 para 3-p. 343 para 1.

Deymier et al., One-Dimensional Mass-Spring Chains Supporting Elastic Waves with Non-Conventional Topology, Crystals 2016, vol. 6, issue 4, article 44, pp. 1-16; retrieved from the Internet: <DOI: 10.3390/cryst6040044> see entire document, especially, p. 2 para 3-p. 3 para 1, Apr. 2016.

Yuan et al., Unexpected photoluminescence properties from one-dimensional molecular chains, Nanoscale 2015, vol. 8, issue 3, pp. 1456-1461; retrieved from the Internet: <DOI: 10.1039/c5nr05795g> see entire document, especially, p. 1 col. 2 para 2; p. 3 col. 1 para 2.

Liu et al., Raman spectroscopy of bromine chains inside the one-dimensional channels of AIPO4-5 single crystals, Journal of Raman Spectroscopy, 2015, vol. 46, issue 4, pp. 413-417; retrieved from the Internet: <DOI: 10.1002/jrs.4664> see entire document.

Deymier et al., Phase properties of elastic waves in systems constituted of adsorbed diatomic molecules on the (001) surface of a simple cubic crystal, Journal of Applied Physics—Transactions of the ASME, Mar. 28, 2018, vol. 123, issue 12, pp. 1-13; retrieved from the Internet: <DOI: 10.1063/1.5007049> see entire document.

\* cited by examiner

US 11,017,756 B2

PHONONIC SYSTEM TO ACHIEVE QUANTUM-ANALOGUE PHASE-BASED UNITARY OPERATIONS

GOVERNMENT SUPPORT

This invention was made with government support under grant No. 1640860 awarded by the National Science Foundation. The Government has certain rights in the invention.

FIELD

The present disclosure generally relates to a phononic system, and in particular to a phononic system to achieve quantum-analogue phase-based unitary operations.

BACKGROUND

An understanding of sound and elastic waves is driven by the paradigm of the plane wave and its periodic counterpart (the Bloch wave) in periodic media. This paradigm relies on the four canonical characteristics of waves: frequency ($\omega$); wave vector (k); amplitude (A); and phase ($\phi$). Over the past decades, the fields of phononic crystals and acoustic meta-materials have developed, with research directed in part to the manipulation of spectral and refractive properties of phonons and sound waves in their respective host material(s) via the exploitation of $\omega$ and k.

Spectral properties of elastic waves include phenomena such as the formation of stop bands in the transmission spectrum due to Bragg-like scattering or resonant processes, and the capacity to achieve narrow band spectral filtering by introducing defects in the structure of the host material. Negative refraction, zero-angle refraction and other unusual refractive properties utilize the complete characteristics of the dispersion relations of elastic waves, $\omega(k)$, over both frequency and wave number domains.

More recently, renewed attention has been paid to the amplitude and the phase characteristics of elastic waves. For instance, when sound waves propagate in media under symmetry breaking conditions, the sound waves may exhibit amplitudes $A(k)=A_0 e^{i\Theta(k)}$ that acquire a geometric phase $\eta$ leading to non-conventional topology, where the notion of geometric phase is related to that of elastic Green's functions. In particular, for Hermitian operators like those of elastic dynamical systems, the notion of the Berry connection is proportional to the imaginary part of its Green's function. This notion can be illustrated via a one-dimensional harmonic crystal with a finite length harmonic side branch acting as a scatterer, where the scattering phase (i.e., Friedel phase) and the phase of the transmission amplitude for the resonating side-branch are related to the geometric phase.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1:
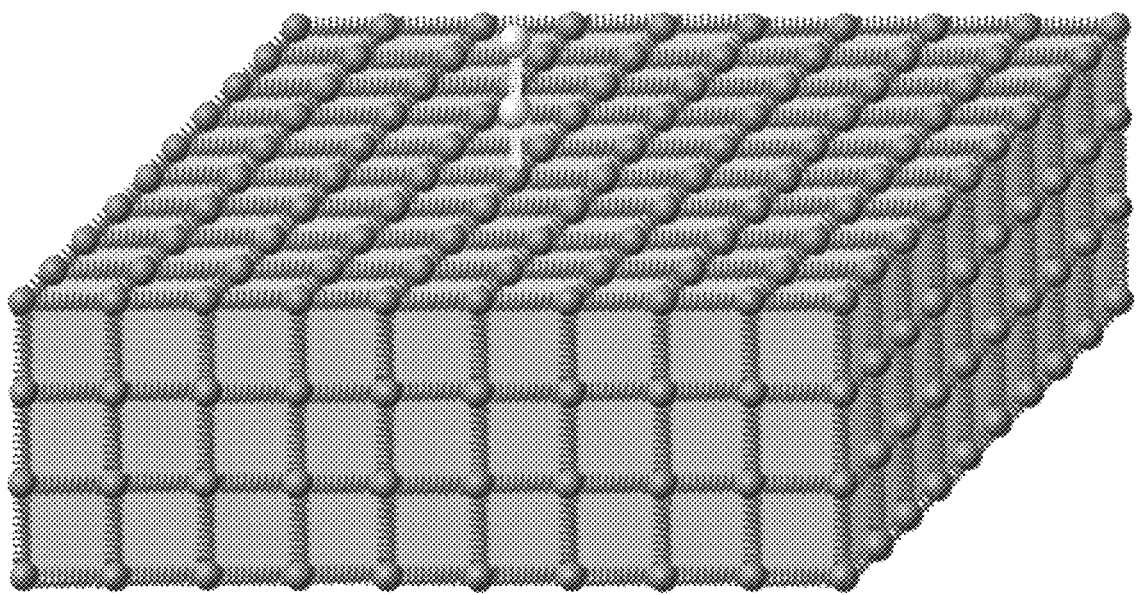
FIG. 1 is a schematic illustration of a diatomic molecule adsorbed on the surface of a semi-infinite cubic crystal, according to aspects of the present disclosure.

The present disclosure pertains to a model of a cleaved semi-infinite simple elastic harmonic cubic crystal with a surface that can adsorb harmonic diatomic molecules. In such a model, the masses in the cubic crystals are identical and connected via harmonic springs along the edges of the simple cubic lattice. The diatomic molecules are constituted of two masses connected via a single harmonic spring. For the sake of mathematical tractability, the dynamic equations of the elastic system are limited to displacements of masses in one single direction. Using Interface Response Theory (IRT), the elastic Green's function (and more specifically, the diffusion matrix) of the surface with adsorbed molecules can be calculated in terms of the Green's function of the individual components (e.g. uncoupled molecules and free surface). The variation in phase and density of states, relative to a system composed of the surface and uncoupled molecules, is calculated from the determinant of the diffusion matrix.

Models: 1-D Molecule Adsorbed on the Surface of a Simple Cubic Crystal

The calculation of the Green's function of a system composed of a semi-infinite simple cubic crystal (cleaved along the (001) face) and a finite 1-D monatomic coupled to a surface atom via a spring with constant $\beta_1$ begins with the block matrix describing the Green's function of the uncoupled system (e.g., where $\beta_1=0$):

$$\vec{G}_s = \begin{pmatrix} \vec{g}_{s1} & \vec{0} \\ \vec{0} & \vec{g}_{s2} \end{pmatrix}, \quad (1)$$

where $\vec{g}_{s1}$ is the Green's function of the semi-infinite simple cubic crystal and $\vec{g}_{s2}$ in is the Green's function of The diatomic molecule. For the sake of simplicity and clarity of illustration, the masses and spring constants of the crystal and molecules are chosen to be identical, m and $\beta$. The spacing between masses along the molecule is a. The Green's function of a finite harmonic polymer of length L (for n, n'∈[1, L]), with coordinates along the polymer expressed as integer multiples of that spacing: x=na, is given by:

$$g_{s2}(n, n') = \qquad (2)$$
$$\frac{m'}{\beta'}\left[\frac{t^{|n-n'|+1} + t^{n+n'}}{t^2-1} + \frac{t^{2L+1}}{(t^2-1)(1-t^{2L})}\left(\begin{matrix} t^{n'-n} + t^{n-n'} + t^{1-n-n'} + \\ t^{n+n'} - 1 \end{matrix}\right)\right]$$

where $$t = \begin{cases} \xi - (\xi^2-1)^{1/2} & \text{if } \xi > 1 \\ \xi + (\xi^2-1)^{1/2} & \text{if } \xi < -1 \\ \xi + i(1-\xi^2)^{1/2} & \text{if } -1 \leq \xi \leq 1 \end{cases} \qquad (3)$$

-continued
with $$\xi = 1 - \frac{m\omega^2}{2\beta} \qquad (4)$$

noting that the frequency $\omega \in [0, \omega_0]$ with $$\omega_0 = 2\sqrt{\frac{\beta}{m}}$$

and that a diatomic molecule is a polymer with L=2.

The Green's function of the semi-infinite cubic crystal possesses translational periodicity in the plane of the (001) surface and can be written as a two-dimensional Fourier transform:

$$\vec{g}_{s1}(\omega, x_1, x_2, x_3) = \qquad (5)$$
$$\frac{1}{(2\pi)^2} \int_{-\frac{\pi}{a}}^{\frac{\pi}{a}} dk_1 \int_{-\frac{\pi}{a}}^{\frac{\pi}{a}} dk_2 e^{i(k_1 x_1 + k_2 x_2)} \vec{g}_{s1}(\omega, k_1, k_2, x_3)$$

Here, $(x_1, x_2)$ is a site on the (001) surface of the semi-infinite cubic crystal, where the surface is located at $x_3=0$. The lattice parameter of the semi-infinite cubic crystal is also taken as a. The Fourier transform of the Green's function $\vec{g}_{s1}$ is given by:

$$\vec{g}_{s1}(\omega, k_1, k_2, x_3) = \frac{m}{\beta} \frac{t^{|n_3 - n_3'|+1} + t^{2-(n_3+n_3')}}{t^2-1} \qquad (6)$$

where in the context of Eq. 6 above:

$$n_3^{()} = \frac{x_3^{()}}{a}.$$

It is noted that $g_{s1}(\omega, x_1, x_2, x_3=0)$ is calculated as a two-dimensional Fourier transform of, e.g., the application of Eq. (5) to Eq. (6). It is further noted that Eq. (6) necessitates the calculation of t via Eq. (3). For the Fourier transform, the dispersion relation for a simple cubic crystal $$\left(\omega^2 = \frac{2\beta}{m}(3 - \cos k_1 a - \cos k_2 a - \cos k_2 a)\right)$$

is used to define:

$$\xi = 3 - \cos k_1 a - \cos k_2 a - \frac{m\omega^2}{2\beta}. \qquad (7)$$

If a position is defined on the surface of the crystal: $p_i=(x_1^{(i)}, x_2^{(i)}, 0)$, then for every frequency the calculation of a Green's function is: $g_{s1}(p_i, p_j) = g_{s1}(p_i - p_j = (x_1^{(j)} - x_1^{(i)}, x_2^{(j)} - x_2^{(i)}, 0))$ for $(x_1^{(j)} - x_1^{(i)}, x_2^{(j)} - x_2^{(i)}, 0) = \{(0,0,0), (0,1a, 0), (0,2a, 0), (1a, 0,0), (2a, 0,0), (1a, 1a, 0), (1a, 2a, 0), (2a, 1a, 0)\}$.

All other $g_{s1}$ are neglected herein. Hence, a cut off of $|p_i-p_j|=\sqrt{5}a$ is considered for the Green's function $g_{s1}(p_i,p_j)$. Note that it is denoted $g_{s1}(|p_i-p_j|=0)=g_{00}$; $g_{s1}(|p_i-p_j|=1a)=g_{01}$; $g_{s1}(|p_i-p_j|=2a)=g_{02}$; $g_{s1}(|p_i-p_j|=\sqrt{2}a)=g_{11}$; and $g_{s1}(|p_i-p_j|=\sqrt{5}a)=g_{12}$. The numerical functions $g_{s1}(p_i,p_j, \omega)$ are replaced by fits to functions of frequency $\omega$. (These fits are given in Appendix A of the present disclosure, with reference to FIG. 16)

Following the IRT (Interface Response Theory), a coupling operator is defined that enables a site 1 of a diatomic molecule to be coupled to a site X (effectively $X=(x_1,x_2,x_3=0)$) on the surface of the cubic crystal:

$$\vec{V}_I = \begin{pmatrix} V_I(X,X) & V_I(X,1) \\ V_I(1,X) & V_I(1,1) \end{pmatrix} = \begin{pmatrix} \frac{-\beta_I}{m} & \frac{\beta_I}{m} \\ \frac{\beta_I}{m} & \frac{-\beta_I}{m} \end{pmatrix}. \quad (8)$$

For the sake of simplicity, it is taken that: $\beta_1=\beta$.

IRT introduces the surface operator expressed in the space M of coupled interface sites:

$$\vec{A}_0(MM) = \begin{pmatrix} A(X,X) \\ A(X,1) \\ A(1,X) \\ A(1,1) \end{pmatrix} = \begin{pmatrix} V_I(X,X)g_{S1}(X,X) \\ V_I(X,1)g_{S2}(1,1) \\ V_I(1,X)g_{S1}(1,X) \\ V_I(1,1)g_{S2}(1,1) \end{pmatrix}. \quad (9)$$

The diffusion matrix then takes the form of a 2×2 matrix in the space M of the coupled interface sites:

$$\vec{\Delta}(MM) = \begin{pmatrix} 1+A(X,X) & A(X,1) \\ A(1,X) & 1+A(1,1) \end{pmatrix} = \begin{pmatrix} 1+V_I(X,X)g_{S1}(X,X) & V_I(X,1)g_{S2}(1,1) \\ V_I(1,X)g_{S1}(1,X) & 1+V_I(1,1)g_{S2}(1,1) \end{pmatrix} \quad (10)$$

The phase difference (normalized to $\pi$) of elastic modes in the space M between the coupled system and the uncoupled system is then obtained from the relation $$\eta(w) = -\frac{1}{\pi}\text{Im}[\ln(det\vec{\Delta}(MM))] \quad (11)$$

Note that Eq. (11) effectively gives the phase accumulated by the wave scattered by the adsorbed diatomic molecules. The variation in density of states due to the coupling is then obtained from the relation $$\Delta n(\omega) = \frac{d\eta(\omega)}{d(\omega^2)} \quad (12)$$

Models: Multiple Diatomic Molecules Adsorbed on the Surface of a Cubic Crystal

Where the previous section considered the modeling of a 1-D molecule adsorbed on the surface of a simple cubic crystal, the present disclosure turns now to a consideration of the modeling of Nc identical diatomic molecules grafted on the (001) surface of the simple cubic crystal. The space M for the system is now defined as:

$$M = \{p_1 = (0, 0, 0), 1, p_2 = (x'_1, x'_2, 0), 1', p_3 = (x''_1, x''_2, 0), 1'', \ldots, p_{N_c} = (x_1^{(N_c-1)}, x_2^{(N_c-1)}, 0), 1^{(N_c-1)}\} \quad (13)$$

The first finite chain has been located at the origin on the crystal surface. In this case, the coupling operator is a $2N_c \times 2N_c$ matrix of the form:

$$\vec{V}_I = \frac{\beta_I}{m} \begin{pmatrix} -1 & 1 & 0 & 0 & \ldots & 0 & 0 \\ 1 & -1 & 0 & 0 & \ldots & 0 & 0 \\ 0 & 0 & -1 & 1 & \ldots & 0 & 0 \\ 0 & 0 & 1 & -1 & \ldots & 0 & 0 \\ \vdots & \vdots & \vdots & \vdots & \ldots & \vdots & \vdots \\ 0 & 0 & 0 & 0 & 0 & -1 & 1 \\ 0 & 0 & 0 & 0 & 0 & 1 & -1 \end{pmatrix}. \quad (14)$$

To calculate $\ddot{\Delta}(MM) = \ddot{I}(MM) + \ddot{V}_I(MM)\ddot{G}_s(MM)$, the Green's function of the uncoupled system, $$\overleftrightarrow{G}_s(MM),$$

is needed, which takes the form:

$$\overleftrightarrow{G}_s(MM) = \begin{pmatrix} g_{s2}(p_1p_1) & 0 & g_{s1}(p_1p_2) & 0 & g_{s1}(p_1p_3) & 0 & \ldots & g_{s1}(p_1p_{N_c}) & 0 \\ 0 & g_{s2}(11) & 0 & 0 & 0 & 0 & \ldots & 0 & 0 \\ g_{s1}(p_2p_1) & 0 & g_{s1}(p_2p_2) & 0 & g_{s1}(p_2p_3) & 0 & \ldots & g_{s1}(p_1p_{N_c}) & 0 \\ 0 & 0 & 0 & g_{s2}(1'1') & 0 & 0 & \ldots & 0 & 0 \\ g_{s1}(p_3p_1) & 0 & g_{s1}(p_3p_2) & 0 & g_{s1}(p_3p_3) & 0 & \ldots & g_{s1}(p_3p_{N_c}) & 0 \\ 0 & 0 & 0 & 0 & 0 & g_{s2}(1^{(2)}1^{(2)}) & \ldots & 0 & 0 \\ \vdots & \vdots & \vdots & \vdots & \vdots & \vdots & & \vdots & \vdots \\ g_{s1}(p_{N_c}p_1) & 0 & g_{s1}(p_{N_c}p_2) & 0 & g_{s1}(p_{N_c}p_3) & 0 & \ldots & g_{s1}(p_{N_c}p_{N_c}) & 0 \\ 0 & 0 & 0 & 0 & 0 & 0 & \ldots & 0 & g_{s2}(1^{(N_c-1)}1^{(N_c-1)}) \end{pmatrix} \quad (15)$$

In this matrix, the odd entries (rows or columns) correspond to locations on the surface of the crystal and the even entries correspond to the position of the first atom of the finite chains.

The diffusion matrix in the space M is:

$$\ddot{\Delta}(MM) = \vec{I} + \overleftrightarrow{A}(M, M) = \vec{I} + \vec{V}_I \overleftrightarrow{G}_s(MM). \quad (16)$$

The phase difference is again given by Eq. (11).

Analysis

In light of the models discussed above, the disclosure turns now to an analysis of several configurations of diatomic molecules adsorbed on the (001) surface of the simple cubic crystal. The analysis focuses on density of states, and more importantly, variation in scattered phase of elastic modes relative to uncoupled reference systems. After the characterization of single adsorbed molecules, the analysis turns to configurations of various adsorbed molecules that take the form of parallel linear chains and parallel chains with kinks along their length.

Analysis: One Molecule Adsorbed on the (001) Surface of a Cubic Crystal

For the purposes of the discussion below, FIG. 1 depicts a system comprising one diatomic molecule absorbed on the surface of the cubic crystal. As stated above in the discussion of models, all masses are the same and take the value 1. All spring constants are identical and also take the value 1.

Figure 2A:
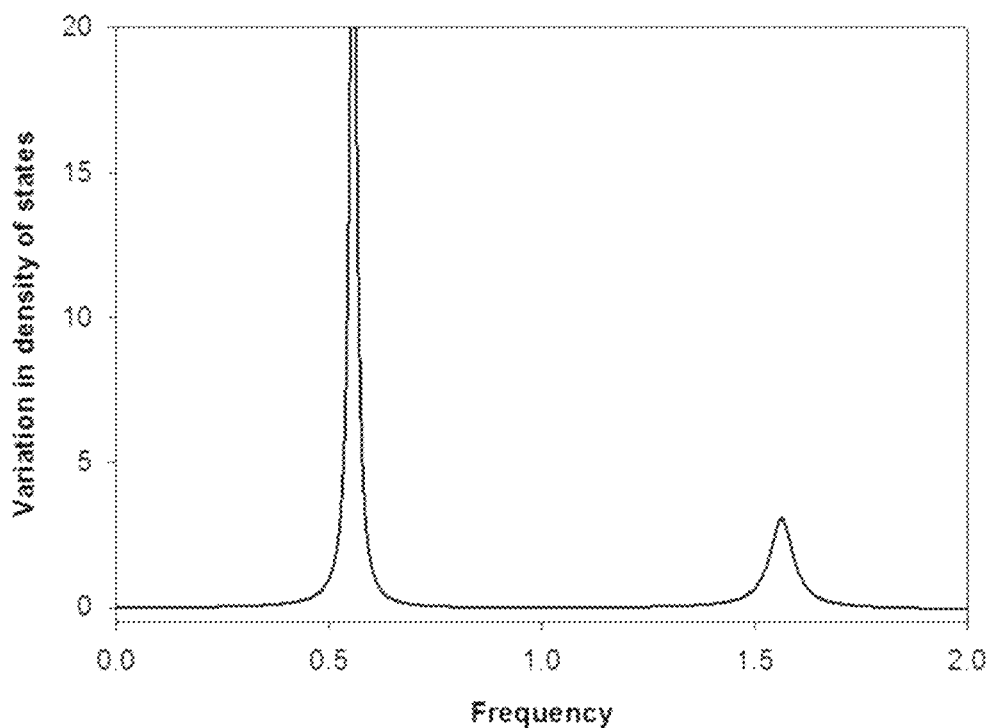
FIG. 2A is a graphical representation of a variation in density of states, $\Delta n(\omega)$, of a system composed of diatomic molecule adsorbed on the (001) surface of a simple cubic crystal.
Figure 2B:
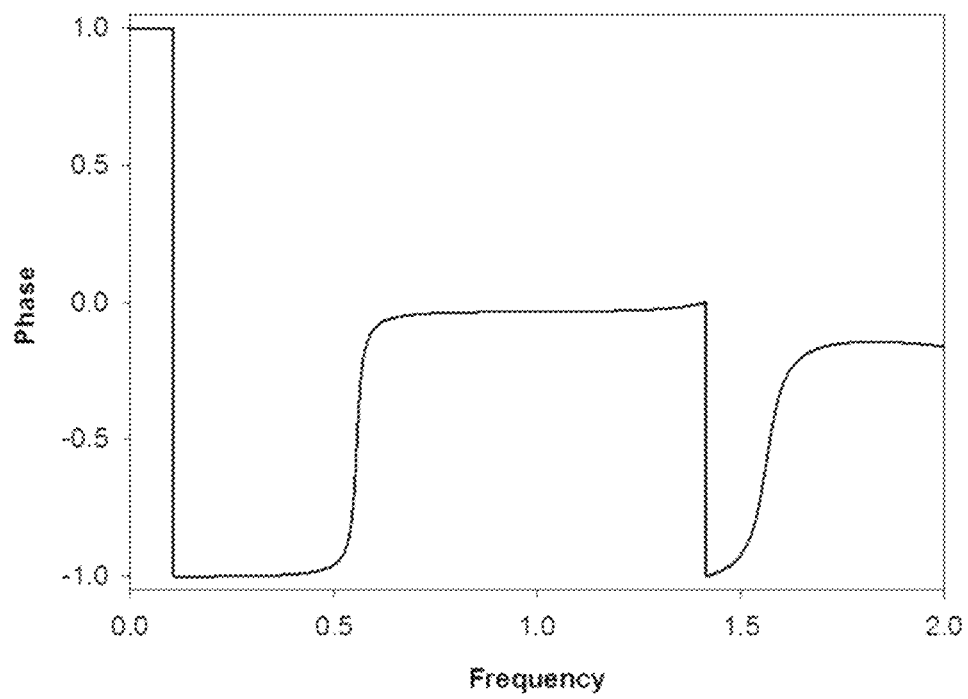
FIG. 2B is a graphical representation of phase, $\eta(\omega)$ for the same system of FIG. 2A, according to aspects of the present disclosure.

FIG. 2A is a graph illustrating the variation in density of states, $\Delta n(\omega)$, of the system of FIG. 1. FIG. 2B is a graph illustrating the phase, $\eta(\omega)$, of the system of FIG. 1. Note that the frequency range $\omega \in [0,2]$ corresponds to the band of the 1-D monatomic harmonic crystal with $m=\beta=1$.

With respect to FIG. 2A, the illustrated variation in density of states exhibits two peaks corresponding to resonances between the crystal and the molecule. The resonances occur at frequencies 0.5570 and 1.5630. With respect to FIG. 2B, the phase shows an inconsequential $2\pi$ jump, two continuous $\pi$ phase changes and one discontinuous $\pi$ phase change.

The continuous variations in phase, which are associated with the Friedel phase, correspond to the resonances at 0.5570 and 1.5630. The derivative of the Friedel phase is directly related to the variation in density of states. The Friedel phase continuously accumulates $\pi$ each time the frequency crosses a bound state in the diatomic molecule.

The discontinuous phase change is the phase change associated with the zeros of the transmitted amplitude of the scattered wave. As frequency increases, each time the scattered amplitude passes through a zero, its real part becomes zero and its imaginary part changes sign. The ratio of the imaginary part to the real part diverges with a sign change across the zero of amplitude. The phase of the diffused wave then exhibits a phase slip of Tr. This behavior has been observed experimentally and discussed theoretically in systems of lower dimensionality for other excitations than phonons, namely electronic excitations.

If one considers a random distribution of $N_c$ diatomic molecules on the surface with intermolecular spacing $|p_i-p_j|$ in excess of $\sqrt{5}a$, one expects no "interactions" between the molecules through the substrate. The variation in density of states for that system, and subsequently its phase, will be essentially the same (to a scaling factor dependent on the number of molecules) as that of FIGS. 2A,B, and the Green's function of the uncoupled system (and subsequently the diffusion matrix) will take a simpler form:

$$\vec{G}_s(MM) = \begin{pmatrix} g_{S2}(p_1p_1) & 0 & 0 & 0 & 0 & 0 & \cdots & 0 & 0 \\ 0 & g_{S2}(11) & 0 & 0 & 0 & 0 & \cdots & 0 & 0 \\ 0 & 0 & g_{S1}(p_2p_2) & 0 & 0 & 0 & \cdots & 0 & 0 \\ 0 & 0 & 0 & g_{S2}(1'1') & 0 & 0 & \cdots & 0 & 0 \\ 0 & 0 & 0 & 0 & g_{S1}(p_3p_3) & 0 & \cdots & 0 & 0 \\ 0 & 0 & 0 & 0 & 0 & g_{S2}(1^{(2)}1^{(2)}) & \cdots & 0 & 0 \\ \vdots & \vdots & \vdots & \vdots & \vdots & \vdots & \cdots & \vdots & \vdots \\ 0 & 0 & 0 & 0 & 0 & 0 & \cdots & g_{S1}(p_{N_c}p_{N_c}) & 0 \\ 0 & 0 & 0 & 0 & 0 & 0 & \cdots & 0 & g_{S2}(1^{(N_c-1)}1^{(N_c-1)}) \end{pmatrix}$$

$$= \begin{pmatrix} g_{S1}(p_1p_1) & 0 \\ 0 & g_{S2}(11) \end{pmatrix} \otimes \begin{pmatrix} 1 & 0 \\ 0 & 1 \end{pmatrix} \otimes \cdots \otimes \begin{pmatrix} 1 & 0 \\ 0 & 1 \end{pmatrix}$$

The Hilbert space of the system of $N_c$ diatomic molecules randomly distributed on sites on the surface is the tensor product of the Hilbert space on each site. Relative to such a tensor product space, the elastic state of the system can be also written as the tensor product of the state of each adsorbed molecule. This is the general definition of a local system. However, if the diatomic molecules are in close proximity (with their nearest neighbor, second nearest neighbor, etc. separation distances on the surface lattice) and are forming ordered patterns with "interactions" defined by the terms of the form: $g_{s1}(p_i p_j)$, $i \neq j$, then the diffusion matrix may not be factorizable into a tensor product of individual adsorbed diatomic molecules. The elastic states' ordered patterns will therefore be non-separable relative to the states of individual adsorbed diatomic molecules. This reflects the collective nature of vibrational modes of configurations of adsorbed diatomic molecules that interact through the substrate. Systems composed of chain-like configurations of adsorbed molecules are discussed below.

Figure 3A:
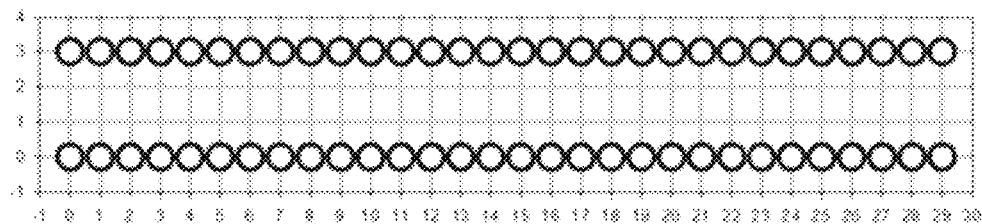
FIGS. 3A-3E are top views of five configurations of $N_c=60$ diatomic molecules adsorbed on the (001) surface of a simple cubic crystal, according to aspects of the present disclosure.
Figure 3B:
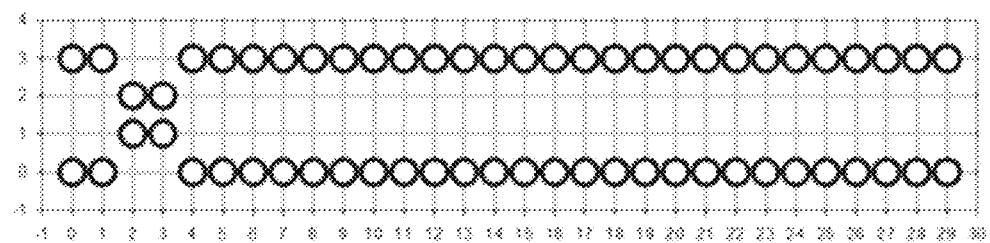
Figure 3C:
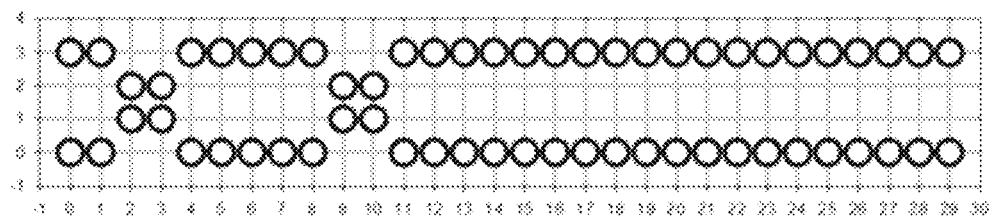
Figure 3D:
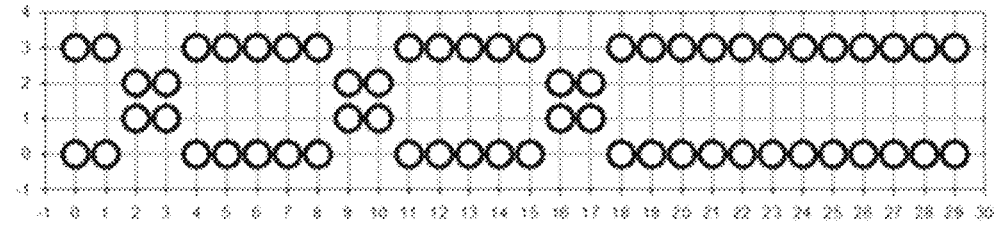
Figure 3E:
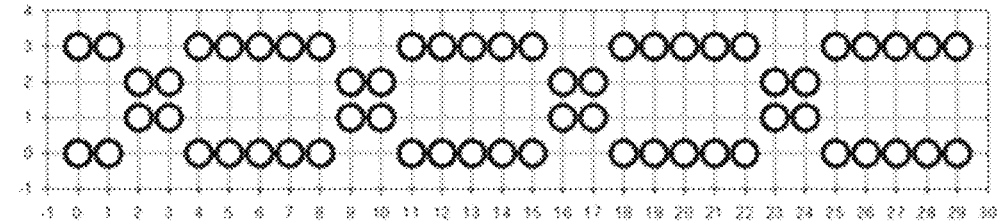

Analysis: Chains of Diatomic Molecules Adsorbed on the Surface of a Cubic Crystal Along the (100) Direction In FIGS. 3A-3E, five configurations of $N_c=60$ diatomic molecules adsorbed on the (001) surface of the cubic crystal are considered. For example, the first configuration, as depicted in FIG. 3A, consists of two parallel arrays of molecules, where the molecules are arranged along the edge of the unit cell of the two-dimensional lattice of the surface and each array contains 30 molecules. The separation distance between the two chains is equal to 3a along the vertical direction, thereby ensuring that any two diatomic molecules located on different chains are not coupled through a $g_{s1}(p_i p_j)$ term in the matrix of Eq. (15). In other words, the two chains of FIG. 3A are not "interacting" through the substrate.

In the remaining FIGS. 3A, 3B, 3C, 3D and 3E, a successive number of kinks are shown as occurring periodically along the chains while the positions of the ends of the chains are remaining fixed. The kinks are realized by displacing two diatomic molecules in each chain up and down by a from the positions in the two parallel chain configuration (FIG. 3A). The constraints imposed on these configurations are that the number of adsorbed molecules is constant and equal to $N_c=60$, and that the ends of the chains are always kept at the same coordinates on the surface.

Figure 4:
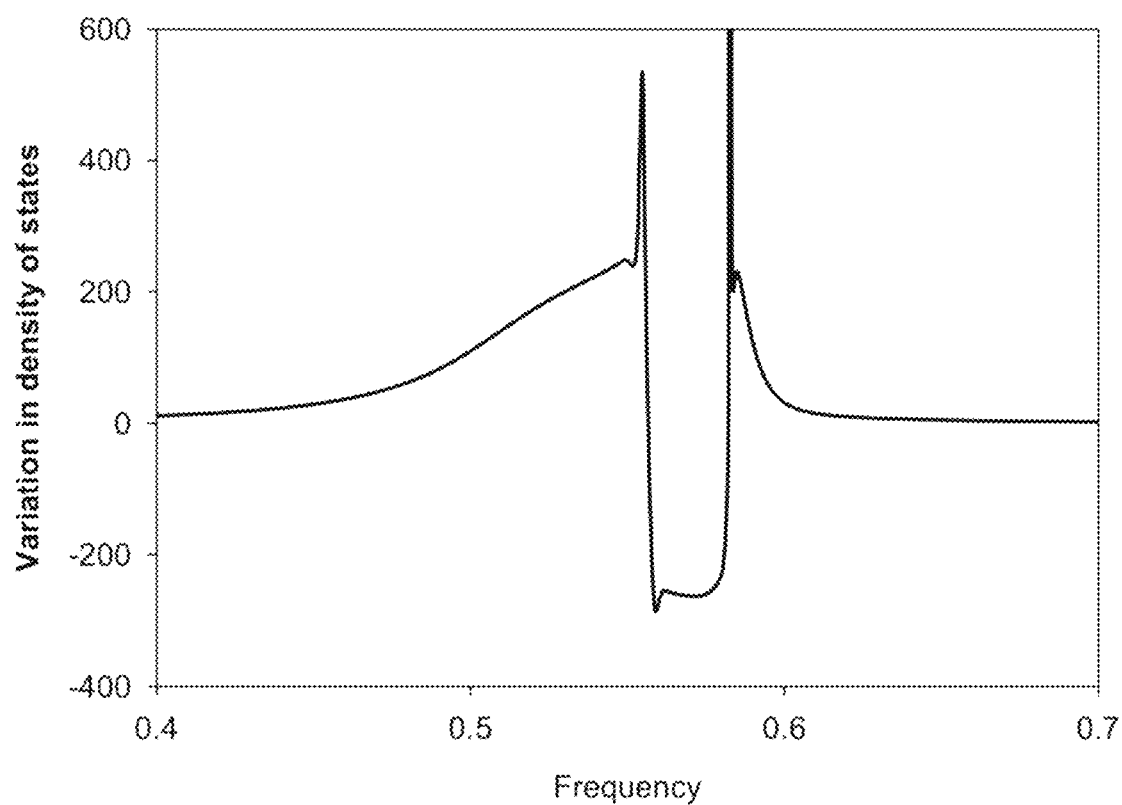
FIG. 4 is a graphical representation of a variation in density of states $\Delta n(\omega)$ of the two parallel chain-like arrangements of adsorbed diatomic molecules shown in FIG. 3A, according to aspects of the present disclosure.

FIG. 4 is a graph illustrating the variation in density of states, $\Delta n(\omega)$, of the two parallel chain-like arrangement of FIG. 3A. The frequency range, e.g. to $\omega \in [0.4, 0.7]$ corresponds to the first resonance of FIG. 2A. The resonance frequency of one diatomic molecule is 0.55770 and corresponds to the first sharp peak in FIG. 4.

The variation in density of states exhibits a wide region of large negative values above this first resonance of an individual adsorbed molecule (frequency 0.5570). This is characteristic of the formation of a resonant "gap" above that frequency. This is not a true gap as the number of molecules in each chain is finite. But the finite system reflects the behavior of its infinite counterpart in the form of a finite depression in the density of states. This "gap" results from the hybridization of the lower frequency mode of diatomic molecules and the substrate modes.

Above and below this gap, the elastic modes are dispersive and the frequency now depends on a parameter that can be defined as a "wave number" along the direction of the chains. The dispersive modes cannot be expressed as a tensor product of states of individual adsorbed molecules. Indeed, the modes of $N_c=60$ randomly well-separated diatomic molecules would have the same frequency. It is the substrate terms in the Green's function matrix (Eq. (15)) contributing through the coupling operator to form the diffusion matrix that lead to this dispersive behavior. The non-separability of the elastic modes of an adsorbed chain is only relative to the elastic states of a configuration composed of well-separated individual adsorbed diatomic molecules.

As noted previously, the dynamical equations (Hamiltonian) of the adsorbed chain system are linear and modes can be expressible as plane waves. The state of the adsorbed loop system is therefore separable as a tensor product of plane wave states. It is known that given a multipartite physical system, whether quantum or classical, the way to subdivide it into subsystems is not unique. The "gap" is robust as it also appears for configurations derived from the parallel chains but altered in a manner such as that seen in the introduction of kinks in FIGS. 3B-E.

The system of FIG. 3A constitutes the reference system. The phase $\eta(\omega)$ of each configuration seen in FIGS. 3A-E is calculated and corrected for $2\pi$ discontinuities arising from the numerical calculation, and is shown in FIG. 5A.

Figure 5A:
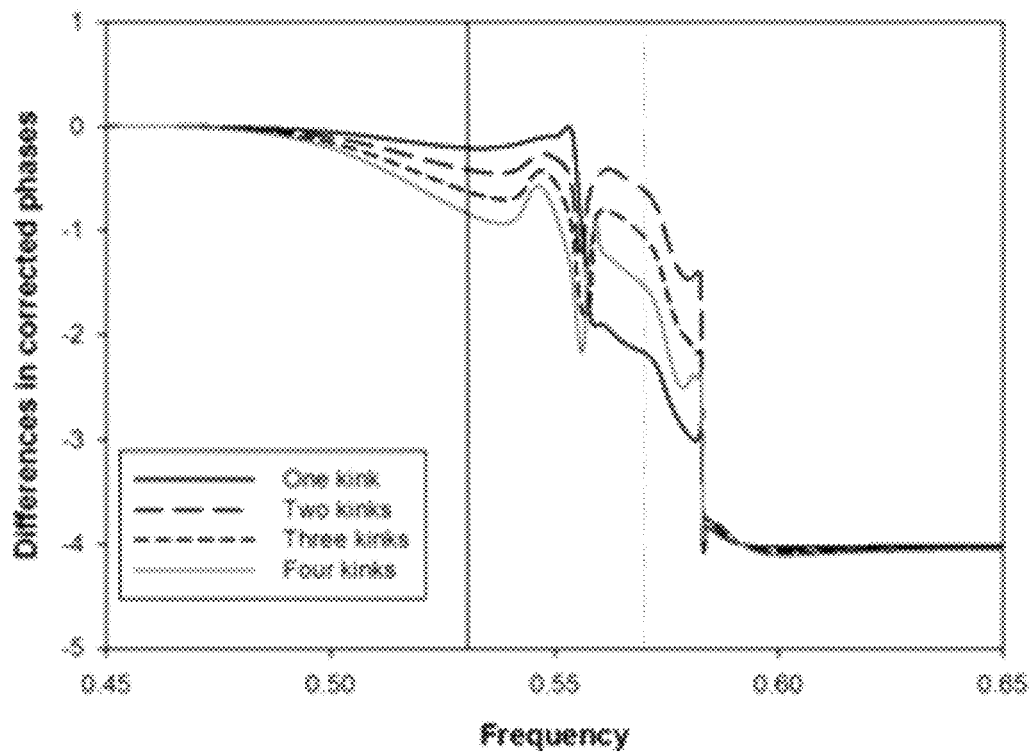
FIG. 5A is a graphical representation of differences in phase $\eta(\omega)$ corrected for $2\pi$ jumps relative to the two parallel chain system for one, two, three, and four kinks of FIGS. 3B-E, according to aspects of the present disclosure.

In particular, in FIG. 5A, the four differences in corrected phases: $\eta^{(b)}-\eta^{(a)}$, $\eta^{(c)}-\eta^{(a)}$, $\eta^{(d)}-\eta^{(a)}$, and $\eta^{(e)}-\eta^{(a)}$, for one, two, three, and four kinks, respectively, are depicted. The vertical solid and dotted lines indicate the frequencies 0.5305 and 0.57, respectively. It is noted that the phase difference decreases monotonically as a function of the number of kinks for frequencies below resonance. It is further noted that a wide range of frequencies below resonance satisfy the rule of phase addition upon successive addition of kinks:

$$r_1 = \frac{\eta^{(c)} - \eta^{(a)}}{\eta^{(b)} - \eta^{(a)}} \sim 2,$$

$$r_2 = \frac{\eta^{(d)} - \eta^{(a)}}{\eta^{(b)} - \eta^{(a)}} \sim 3 \text{ and}$$

$$r_3 = \frac{\eta^{(e)} - \eta^{(a)}}{\eta^{(D)} - \eta^{(a)}} \sim 4.$$

The first ratio $r_1$ illustrates the phase change upon creating two kinks relative to the phase change upon creation of one kink. The second and third ratios, $r_2$ and $r_3$, respectively, refer to the phase change that occurs when three and four kinks, respectively, are created relative to one kink creation.

A particular frequency of 0.5305, for which additive properties of the phase are satisfied, is first chosen. In this case: $\theta_1 = \eta^{(b)} - \eta^{(a)} \cong -0.2$.

Figure 5B:
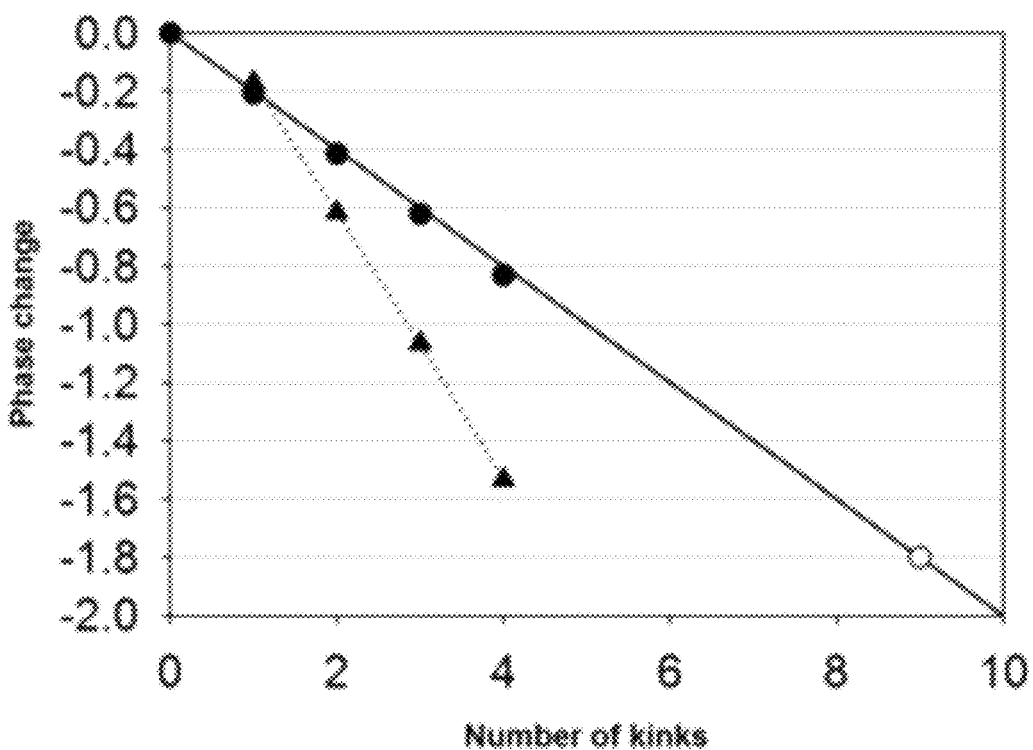
FIG. 5B is a graphical representation of the phase difference illustrated in FIG. 5A at the frequencies 0.5305 and 0.57, according to aspects of the present disclosure.

In FIG. 5B, the four calculated phase differences in phase are plotted as functions of the number of kinks. Closed circles indicate phase difference from the frequency 0.5305 and closed triangles indicate phase difference from the frequency 0.57. The thin diagonal solid line is a linear fit to the closed circles and the thin diagonal dotted line is a fit to the closed triangles. The open circle marks the location of a chain along which one would create 9 kinks. All the phases are in units of $\pi$. The data point corresponding to one kink at the frequency of 0.57 was corrected by a phase shift of 2 to align it with the other data points.

The calculated points fall on the line with equation $\theta_{n_k} = \Delta\theta n_k = -0.2 n_k$ where $n_k$ is the number of kinks. The choice of frequency is also motivated at least in part by the fact that the phase for one kink is the rational quantity $$\theta_1 = \frac{2}{n},$$

where n=10. Because of computational limitations, the present disclosure does not consider longer chains and larger numbers of kinks than 4; however, if one could continue the linear trend of the phase, the addition of kinks would lead to phase differences that sample the unit circle in 10 locations as shown in FIG. 6.

Figure 6:
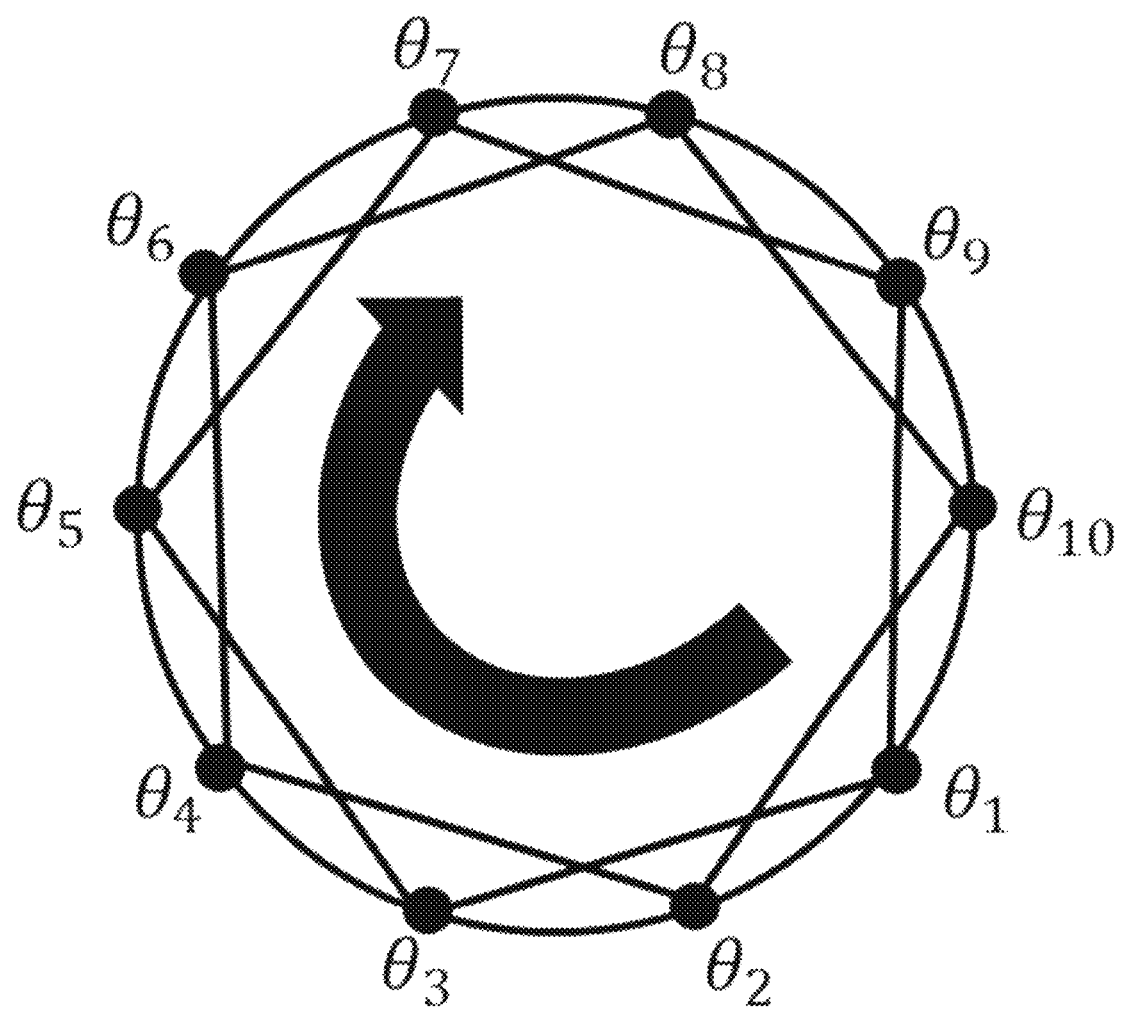
FIG. 6 is a schematic illustration of the evolution of the phase difference $\theta_{nk}$ upon creation of $n_k$ kinks, according to aspects of the present disclosure.

FIG. 6 is a schematic illustration of the evolution of the phase difference $\theta_{nk}$ upon creation of $n_k$ kinks. It is noted that $\theta_9 = +0.2 \mod(2)$. The creation of nine kinks is therefore a configuration equivalent to that of a single kink but with a phase change of the same magnitude and opposite sign. The elastic wave function of two configurations related by the creation of one kink can be expressed as $$u_{n_{k+1}} = e^{i\Delta\theta} u_{n_k} \quad (17)$$

Note that in Eq. (17), it is assumed that the elastic waves have been normalized to their real amplitude.

Returning now to the discussion of FIG. 5B, it is noted that the phase difference as a function of number of kinks for a frequency of 0.57 is plotted as a series of closed triangles. It is interesting to note that the triangular points fall along a straight line which does not intersect the origin. The phase difference follows the equation, $\theta_{n_k} = \Delta\theta n_k + \delta = -0.4464 n_k + 0.2769$. The constant phase 0.2769 is not important as it can be lumped as a constant term into the elastic wave functions in Eq. (17).

Figure 7A:
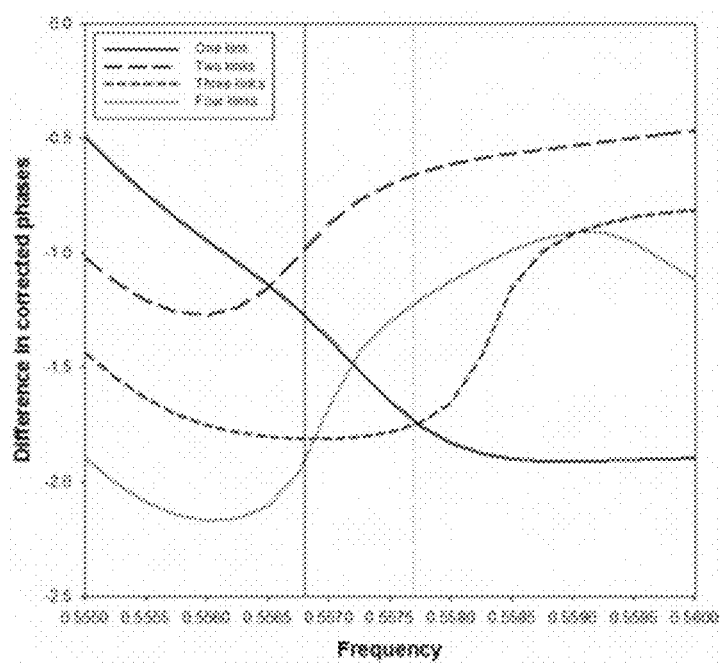
FIG. 7A is a graphical representation of differences in phase $\eta(\omega)$ corrected for $2\pi$ jumps relative to the two parallel chain system for one, two, three, and four kinks of FIGS. 3B-E, magnified in a narrow frequency range around the diatomic molecule resonant frequency.
Figure 7B:
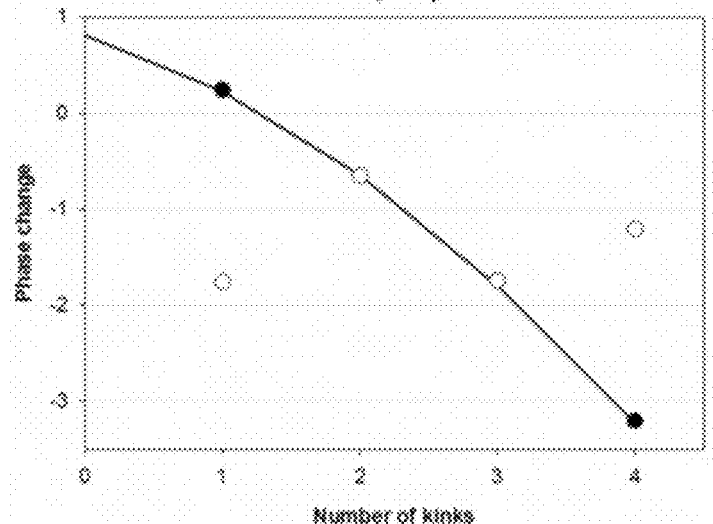
FIG. 7B is a graphical representation of the phase difference of FIG. 7A at the frequency 0.5577, as a function of the number of kinks, according to aspects of the present disclosure.
Figure 7C:
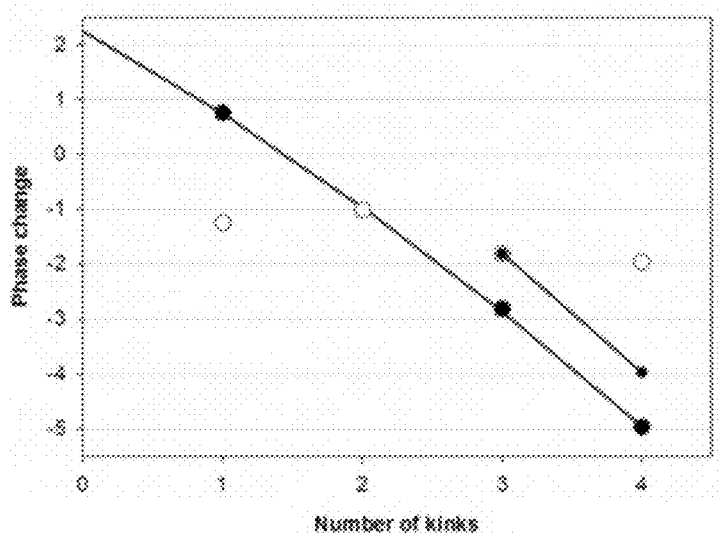
FIG. 7C is a graphical representation of the phase difference of FIG. 7A at the frequency 0.5568, as a function of the number of kinks, according to aspects of the present disclosure.

In FIGS. 7A-C, two other frequencies slightly above and below the first resonant frequency 0.5570 of the diatomic molecule are considered, namely 0.5577 and 0.5568.

FIG. 7A is the same as FIG. 5A, but magnified in a narrow frequency range around the diatomic molecule resonant frequency of 0.5570, with vertical lines added to mark the two new frequencies of 0.5568 and 0.5577.

FIG. 7B shows the phase difference from FIG. 7A as open circles at the frequency 0.5577 as a function of the number of kinks. The closed circles are corrections by $\pm 2$ ($2\pi$) of the phase differences. The thin solid line is a linear fit to the corrected data.

FIG. 7C shows the phase difference from FIG. 7A (the open circles) at the frequency 0.5568 as a function of the number of kinks. The large closed circles are corrections by $\pm 2$ ($2\pi$) and $-1$ ($\pi$) of the phase differences. The thin solid line extending over the interval [0,4] is a linear fit to the corrected data. The small closed circles have been corrected only by $\pm 2$ ($2\pi$).

The differences in phases are shown for one to four kinks in a narrow region of frequency centered on the resonant frequency of the diatomic molecule. At 0.5577, the calculated phase differences for $n_k$=1 and 4 have been corrected by $\pm 2$ ($2\pi$) to form a continuous function. These corrected points are fitted well by a quadratic equation: $\theta_{n_k} = -1.423 \times 10^{-1} n_k^2 - 3.323 \times 10^{-1} n_k + 8.105 \times \times 10^{-1}$.

In contrast to the case of the frequency 0.5305, this relation is non-linear. One may still write:

$$u_{n_{k+1}} = e^{i\Delta\theta(nk)} u_{n_k} \quad (18)$$

with a phase shift dependent on the number of kinks, $\Delta\theta(n_k)$.

At the frequency of 0.5568, below resonance, the behavior of the phase difference is more complex. The calculated phase differences can be corrected by $\pm 2$ ($2\pi$) without consequence. The corrected phase differences do not form a continuous function. The data points for $n_k$=3 and 4 are $\pi$ shifted above such a continuous line. This additional phase difference is not associated with a transmission phase slip of $\pi$ (as seen in FIG. 2B) as the calculated phases in FIG. 7A are continuous. This additional shift is a characteristic of the creation of additional kinks beyond two kinks and the formation of a finite periodic array of kinks leading to crossings of the phase plots in FIG. 7A. Again, the evolution of the elastic wave function as a function of the number of kinks can be represented by Eq. (18).

The relationships given by Eq. (18) are represented mathematically in the form of the product between the vector of the elastic waves for different numbers of kinks, $\Psi$ and a unitary matrix, U:

$$\Psi = (., u_i, u_{i+1}, u_{i+2}, .) = \begin{pmatrix} . & . & . & . & . \\ . & e^{i\Delta\theta_{i-1}} & 0 & 0 & . \\ . & 0 & e^{i\Delta\theta_i} & 0 & . \\ . & 0 & 0 & e^{i\Delta\theta_{i+1}} & . \\ . & . & . & . & . \end{pmatrix} \begin{pmatrix} . \\ u_{i-1} \\ u_i \\ u_{i+1} \\ . \end{pmatrix} = U\Psi \quad (19)$$

It is worth noting that at the frequencies 0.5305 and 0.57, where the accumulation of phase upon creation of additional kinks is a constant (linear dependency of the phase difference on the number of kink), the diagonal terms in Eq. (19) are all identical. Eq. (19) can then be simplified in the form:

$$\Psi = (., u_i, u_{i+1}, u_{i+2}, .) = \begin{pmatrix} . & . & . & . & . \\ . & 1 & 0 & 0 & . \\ . & 0 & 1 & 0 & . \\ . & 0 & 0 & 1 & . \\ . & . & . & . & . \end{pmatrix} e^{i\Delta\theta} \begin{pmatrix} . \\ u_{i-1} \\ u_i \\ u_{i+1} \\ . \end{pmatrix} = I e^{i\Delta\theta} \Psi \quad (20)$$

Analysis: Near Resonance, Phase Difference Depends on Order of Kink Creation

Figure 8A:
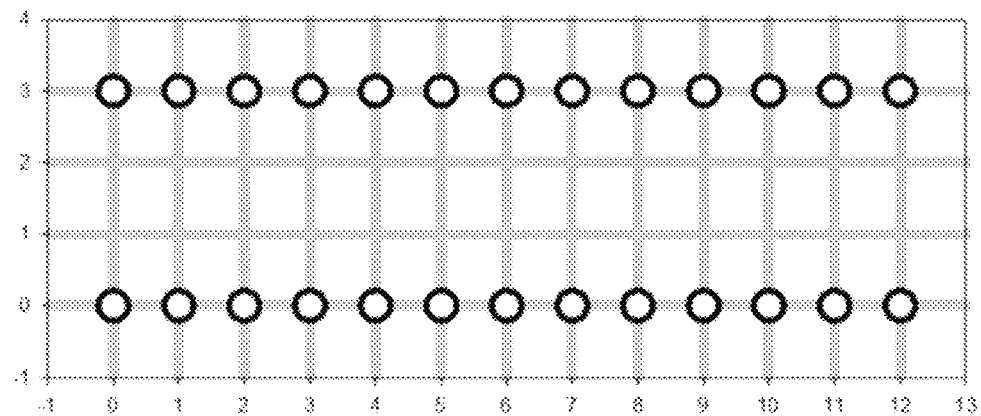
FIGS. 8A-C are top views of three configurations of $N_c=26$ diatomic molecules adsorbed on the (001) surface of the simple cubic crystal, according to aspects of the present disclosure.
Figure 8B:
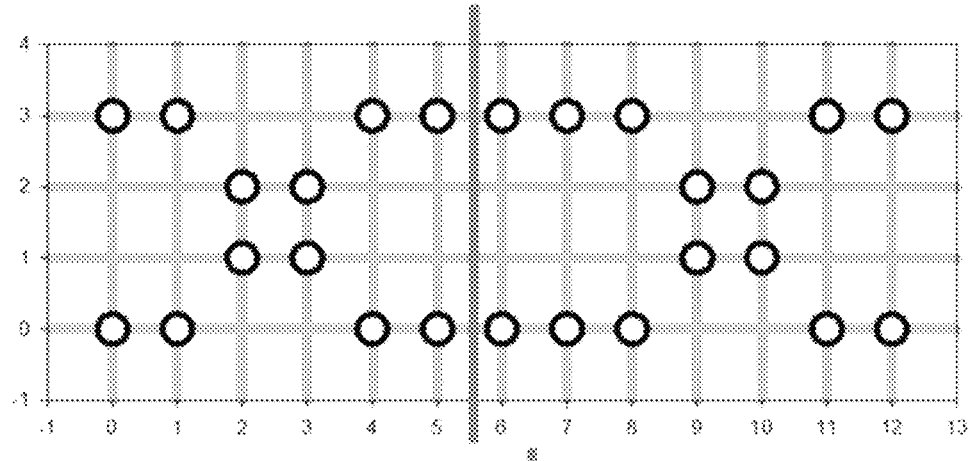
Figure 8C:
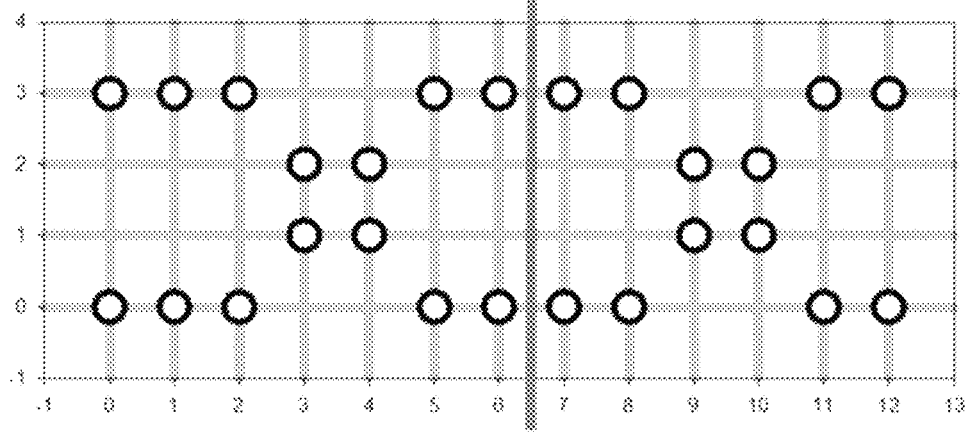

To further analyze the behavior of the phase in the vicinity of resonance, the present disclosure turns now to the three configurations illustrated in FIGS. 8A-C. Each of the three figures is a top view of a configuration of $N_c$=26 diatomic molecules adsorbed on the (001) surface of the simple cubic crystal, with the surface illustrated as a square lattice.

The first configuration, seen in FIG. 8A, includes two parallel chains composed of 13 molecules, that is 12a long.

The configuration of FIG. 8B results when the two linear chains are subjected to the creation of two kinks, done in sequence from left to right. The creation to the first kink (on the left) is characterized by an operator $\sigma_1$. The second kink (on the right) is created by an operator $\sigma_2$. In other words, from left to right the order of creation is $(\sigma_1 \sigma_2)$.

The configuration of FIG. 8C results when the two linear chains are subjected to the creation of two kinks by first, the application of the operator $\sigma_2$, followed by the creation of the second kink by applying the operator $\sigma_1$. In other words, from left to right the order of creation is $(\sigma_2 \sigma_1)$.

Figure 9:
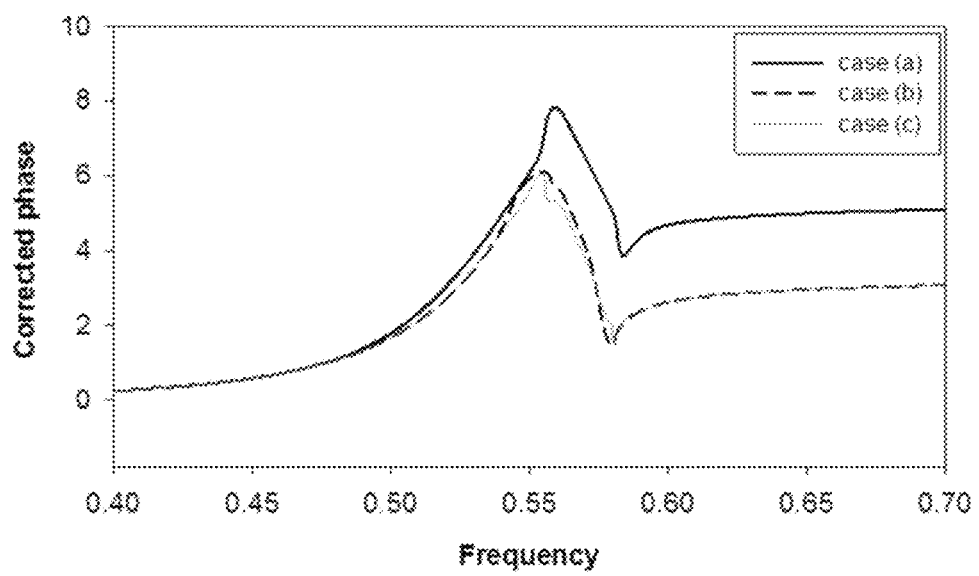
FIG. 9 is a graphical representation of phase $\eta(\omega)$ corrected for $2\pi$ jumps for the three configurations illustrated in FIGS. 8A-8C, according to aspects of the present disclosure.

In FIG. 9, the calculated phases for the three configurations of FIGS. 8A-C are shown, corrected for numerical jumps of $2\pi$. It is noted that the phase near resonance in the case of the configuration of FIG. 8C differs significantly from that of configuration of FIG. 8B.

Figure 10:
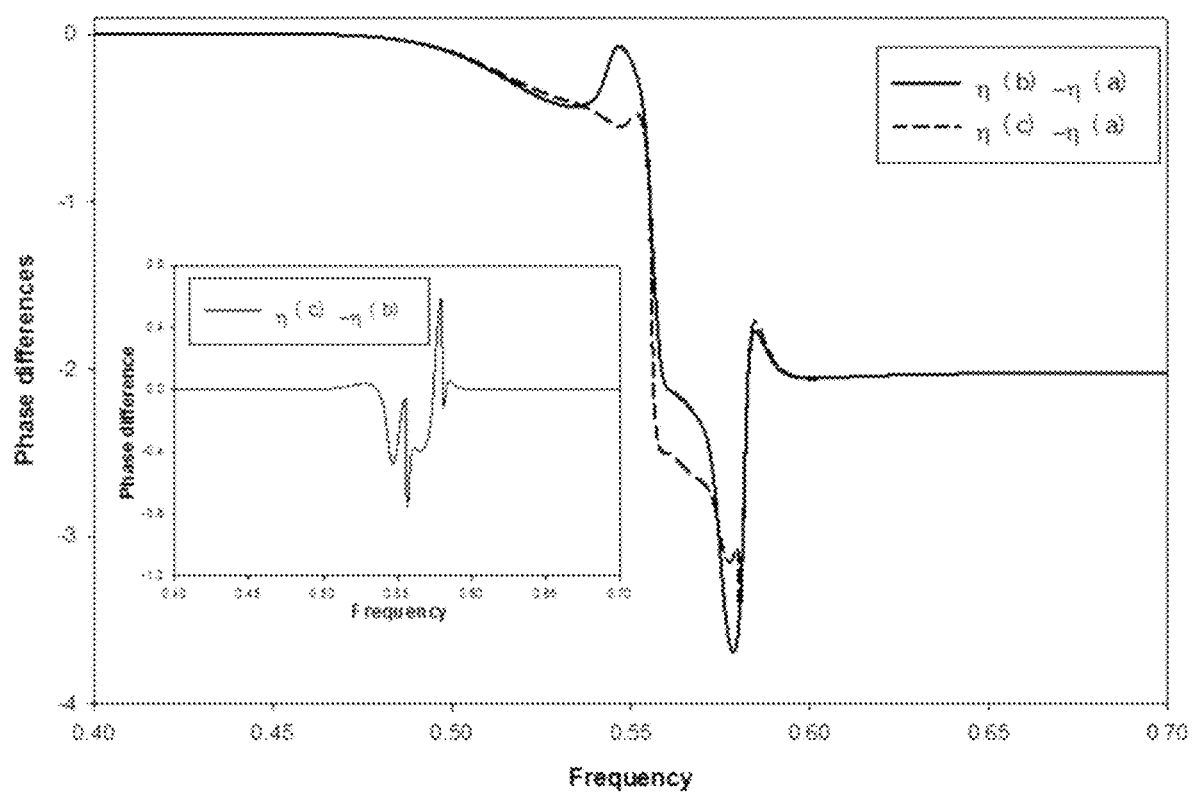
FIG. 10 is a graphical representation of the differences between the corrected phase of the configurations of FIGS. 8B and 8C, and the reference system configuration of FIG. 8A, as functions of frequency, according to aspects of the present disclosure.

The phase difference between the kinked configurations and the parallel chains illustrates even more clearly the fact that the two configurations (i.e. that of FIG. 8B and that of FIG. 8C) do not exhibit the same phase around the resonance (e.g., see FIG. 10 showing differences between the corrected phases of the three configurations of FIGS. 8A-C as functions of frequency, with the inset showing the difference in phase between the two kinked configurations of FIGS. 8B,C). The phase differences do show the same phase behavior at frequencies above and below resonance frequency. This clearly shows that when considering different kink creation operators, e.g. $\sigma_1$ and $\sigma_2$, near resonance, the order of application of these operators matters. Therefore, it can be written that $\sigma_1\sigma_2 \neq \sigma_2\sigma_1$. In other words, near resonance, the order of creation of different kinks matters and the kink creation operators do not generally commute.

Analysis: Chains of Diatomic Molecules Adsorbed on the Surface of a Cubic Crystal Along the (110) Direction Above, chains aligned in the (100) direction in the surface square lattice were considered. However, there are other ways of constructing chains on such a lattice, for example in the (110) direction, as considered herein.

FIGS. 11A-D depict four new configurations of $N_c$=40 diatomic molecules adsorbed on the (001) surface of the simple cubic crystal.

Figure 11A:
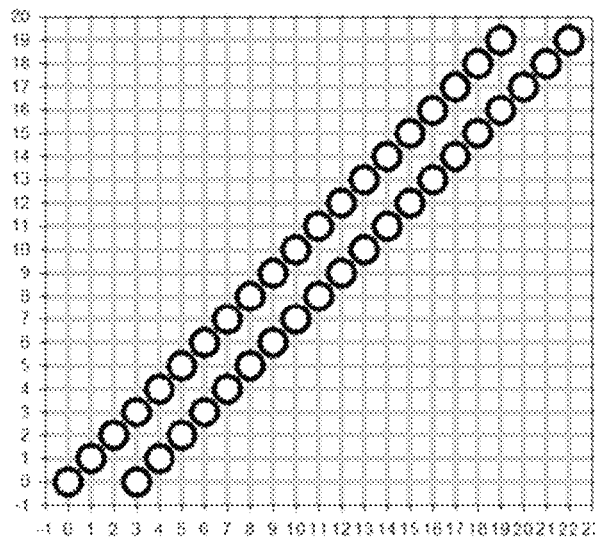
FIGS. 11A-D are top views of four configurations of $N_c=40$ diatomic molecules adsorbed on the (001) surface of a simple cubic crystal, according to aspects of the present disclosure.

FIG. 11A depicts two linear parallel arrays of diatomic molecules arranged along the (110) direction. Each array contains 20 molecules. The chains are separated by a distance exceeding the Green's function cutoff distance $\sqrt{5}a$.

Figure 11B:
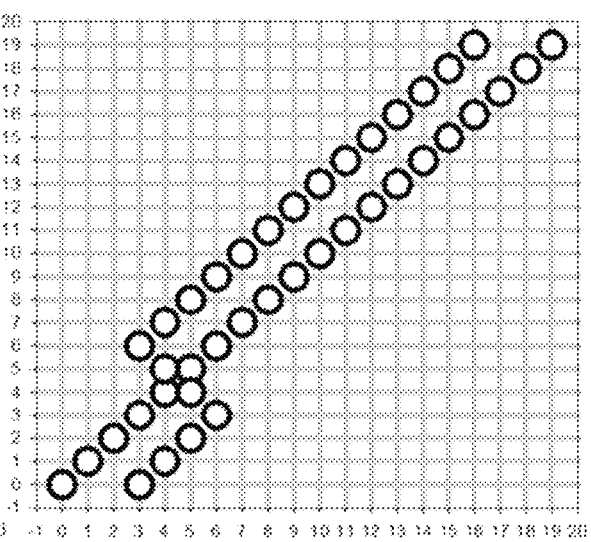

FIG. 11B depicts two linear chains subjected to one kink creation operation. Note that in the process of creating a kink, the overall location of the ends of the chains is translated but their relative position is not.

Figure 11C:
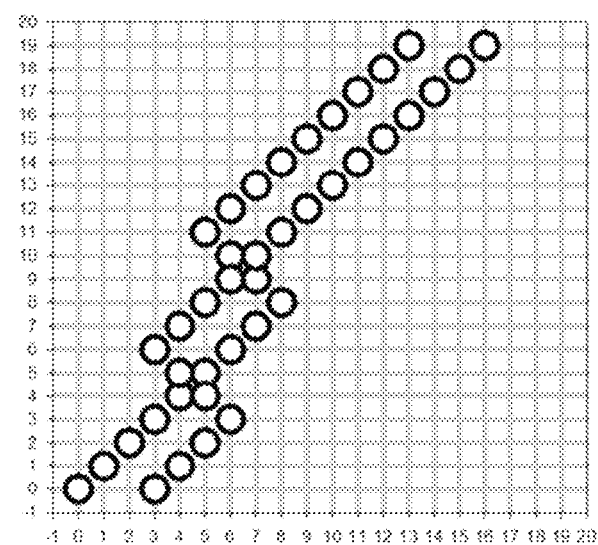

FIG. 11C depicts two linear chains subjected to two successive kink creation operations.

Figure 11D:
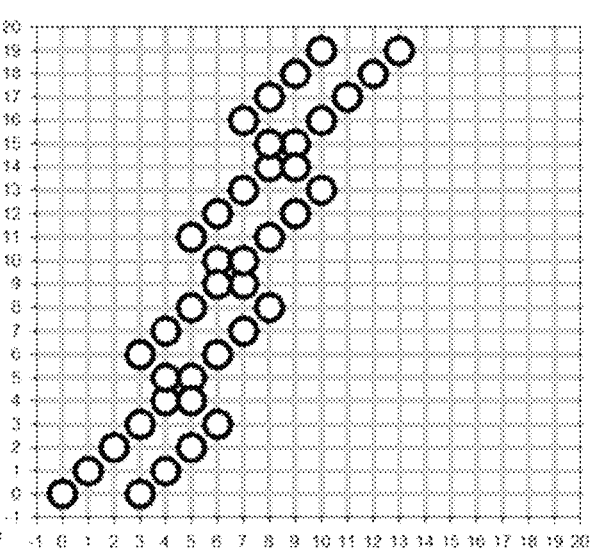

FIG. 11D depicts two linear chains supporting three kinks.

Figure 12:
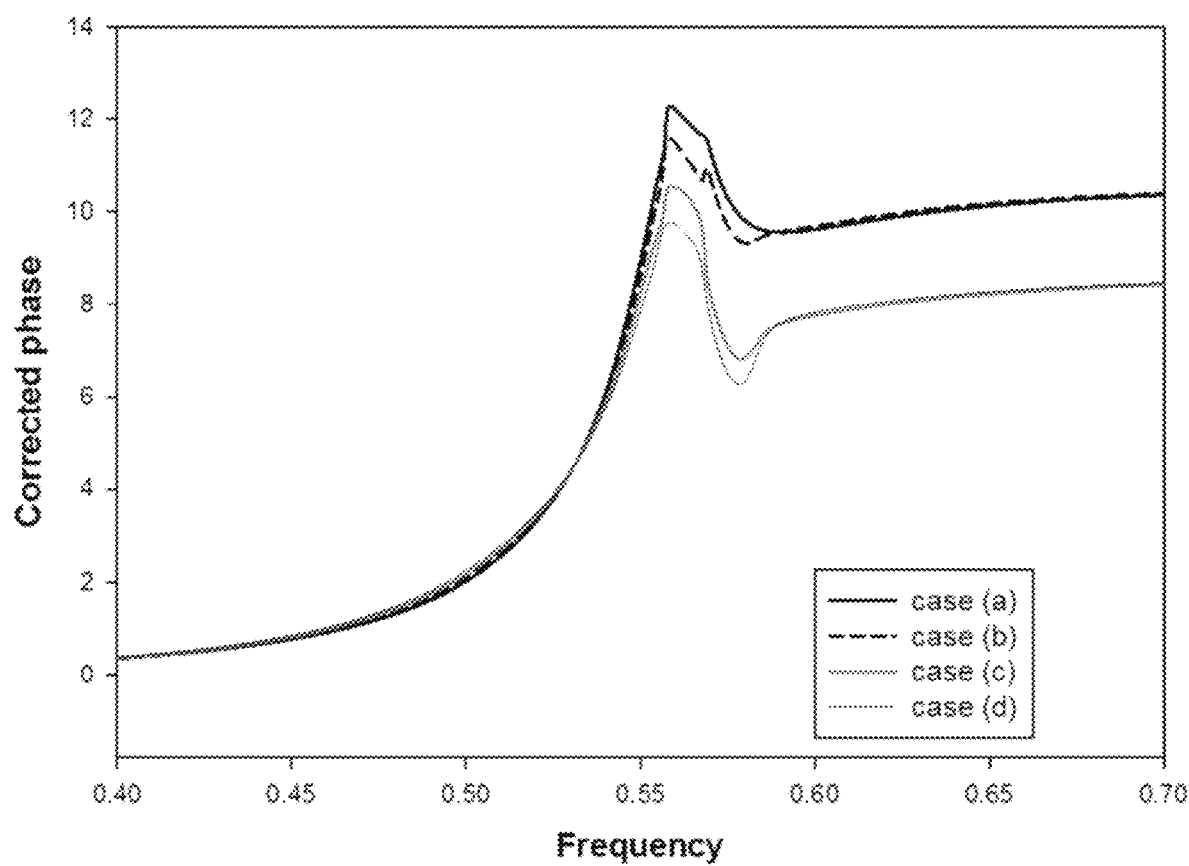
FIG. 12 is a graphical representation of phase $\eta(\omega)$ corrected for $2\pi$ jumps for the four configurations illustrated in FIGS. 11A-D, according to aspects of the present disclosure.

FIG. 12 is a graph illustrating the phases for the four configurations of FIGS. 11A-D as functions of frequency. The phases have been corrected for numerically induced $2\pi$ discontinuous jumps.

The corrected phases differ most significantly in the near vicinity of the resonance. Above resonance, the phases of the configurations of FIGS. 11C,D are $2\pi$ shifted relative to that of the configurations of FIGS. 11A,B. After correcting for this shift, two ratios $r_1$ and $r_2$ can be calculated as follows $$r_1 = \frac{\eta^{(c)} - \eta^{(a)}}{\eta^{(b)} - \eta^{(a)}} \text{ and } r_2 = \frac{\eta^{(d)} - \eta^{(a)}}{\eta^{(b)} - \eta^{(a)}}.$$

Figure 13A:
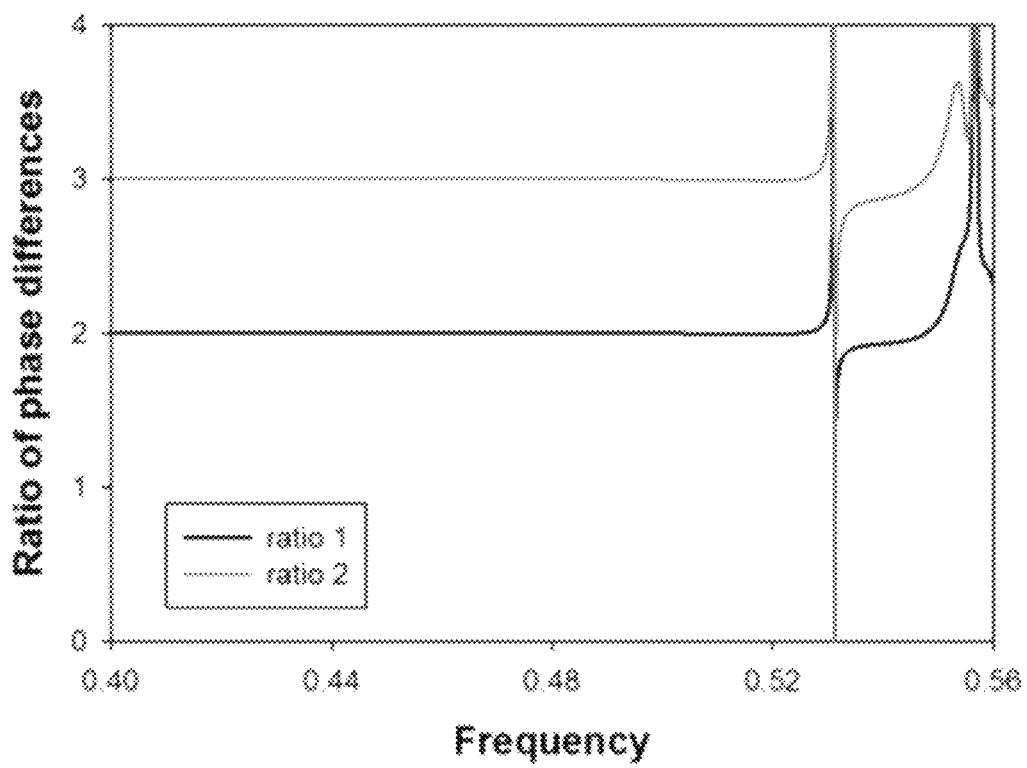
FIG. 13A is a graphical representation of ratios $r_1$ and $r_2$ as functions of frequency at frequencies below resonance.
Figure 13B:
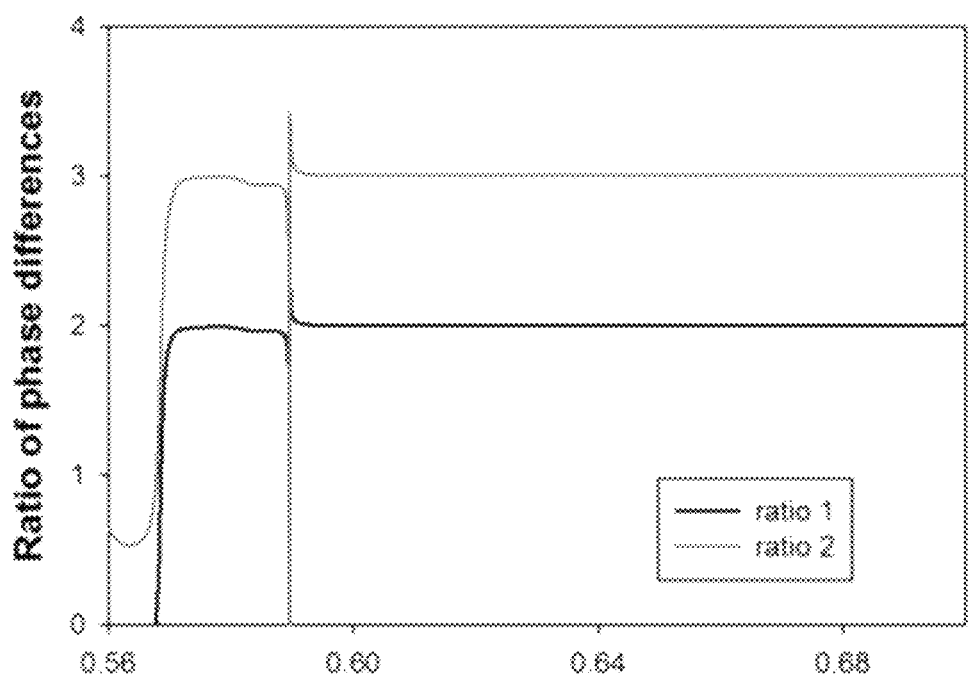
FIG. 13B is a graphical representation of ratios $r_1$ and $r_2$ as functions of frequency at frequencies above resonance, according to aspects of the present disclosure.

FIG. 13A depicts the two ratios $r_1$ and $r_2$ as functions of frequency for frequencies below resonance. FIG. 13B depicts the two ratios $r_1$ and $r_2$ as functions of frequency for frequencies above resonance. The phase differences above resonance were corrected by $2\pi$ prior to the calculation of the ratios.

Here, as was the case for chains along the (100) direction, the phase of parallel chains along the (110) direction increases by a multiple for every kink created. It is noted that for frequencies well below and well above resonance, the ratios $r_1$ and $r_2$ take on the values 2 and 3, respectively. That is, the phase of the system with two kinks is twice that of the system with one kink and the phase of the system with three kinks is thrice times that of the system with one kink. This behavior leads to linear variation of the phase differences with respect to the number of kinks. The phase difference behaves according to Eq. (20).

In FIGS. 13A, B, there are several frequencies for which peculiar behavior is observed. There exist a number of frequencies outside resonance where $\eta^{(b)} - \eta^{(a)} \cong 0$, thus leading also to diverging ratios $r_1$ and $r_2$. Two examples are located at frequencies 0.531 and 0.589. In FIG. 12, at these two particular frequencies the crossing of the phase of the configurations of FIGS. 11A and 11B are clearly seen.

Figure 14:
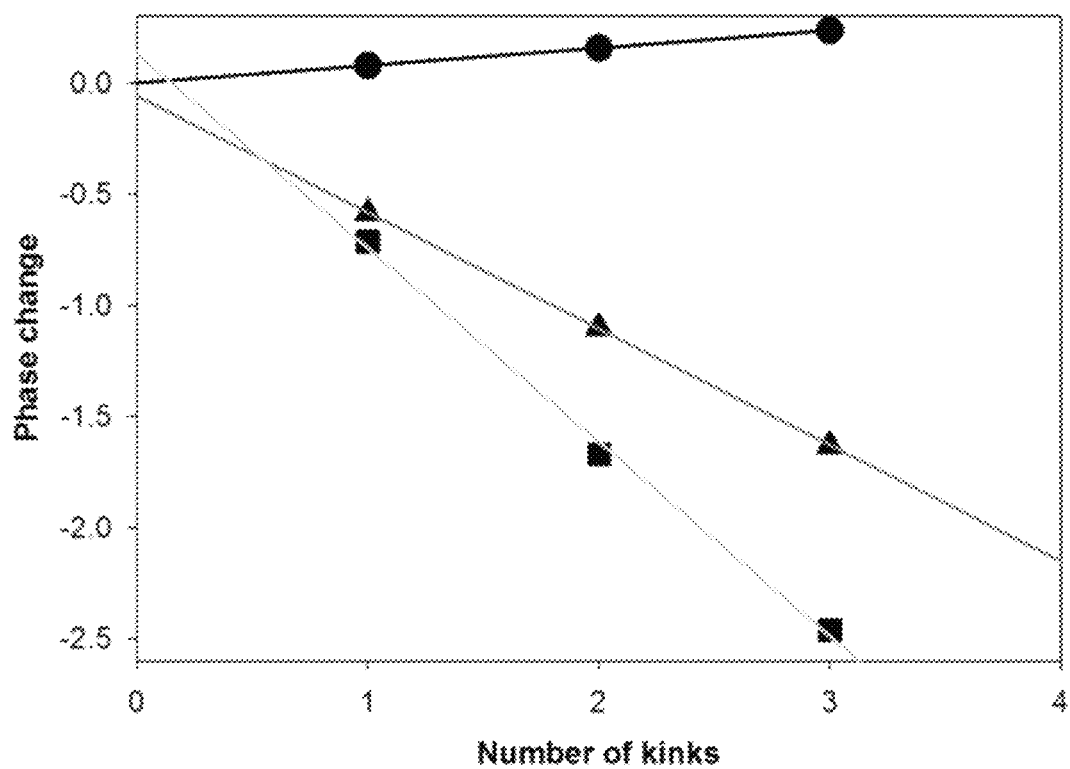
FIG. 14 is a graphical representation of the phase difference of FIG. 12 as a function of the number of kinks at frequencies 0.5052, 0.5599, and 0.57, according to aspects of the present disclosure.

FIG. 14 is a graph plotting phase difference as a function of the number of kinks for three frequencies: 0.5052 (circles), 0.5599 (squares), and 0.57 (triangles). For each of the three frequencies, linear fits are provided. All phases are in units of $\pi$.

In particular, the three linear fits are: $\theta_{n_k}(0.5052) = 7.865 \times 10^{-2}n_k + 1 \times 10^{-4}$; $\theta_{n_k}(0.5599) = -8.736 \times 10^{-1}n_k + 1.313 \times 10^{-1}$; and $\theta_{n_b}(0.5700) = -5.231 \times 10^{-1}n_k - 5.97 \times 10^{-2}$. The intercept for the lowest frequency is within the error of the present calculations and the phase difference intersects with the vertical axis at the origin. The other two cases have finite intercepts but are still showing nearly linear behavior compatible with Eq. (20).

Figure 15:
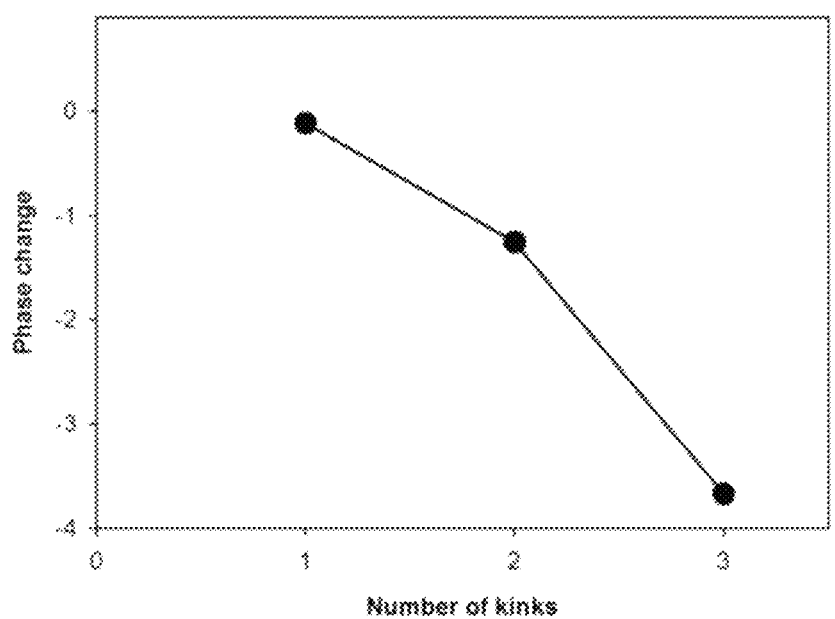
FIG. 15 is a graphical representation of the phase difference of FIG. 12 as a function of the number of kinks for the resonant frequency, according to aspects of the present disclosure.

At the resonant frequency, 0.5570, the phase difference as a function of the number of kinks shows strong non-linear dependency (see e.g., FIG. 15 depicting phase difference as a function of number of kinks for the resonant frequency), which thereby indicates that the elastic wave function follows Eq. (19). Note that the concave plot in FIG. 15 was constructed by applying a $-2\pi$ correction to the last data point (three kinks). However, even in the absence of this correction, the plot would be convex and non-linear.

Quantum Gates

Here, analogies are considered between the phase-based operations that could be accomplished with unitary operations resulting from the creation of kinks in parallel chains of diatomic molecules adsorbed on a simple cubic crystal surface. Quantum gates (or quantum logic gates) are the elementary building blocks of quantum circuits. Quantum gates are represented by unitary matrices which act on the phase of quantum states. The fact that one can transform the phase of elastic waves by modifying the configuration of adsorbed diatomic molecules, and that these transformations can be formulated as unitary matrices acting on the space of the scattered waves, enables analogies to be drawn between elastic phase-based unitary transformations and quantum gates.

Consider the configurations introduced above. At the frequency 0.5577, the phase accumulation as a function of the number of kinks can be reformulated according to Eq. (19) to yield:

$$(u_1, u_2, u_3, u_4, \ldots) = \begin{pmatrix} e^{\Delta\theta_0} & 0 & 0 & 0 & . \\ 0 & e^{i\Delta\theta_1} & 0 & 0 & . \\ 0 & 0 & e^{\Delta\theta_2} & 0 & . \\ 0 & 0 & 0 & e^{i\Delta\theta_3} & . \\ . & . & . & . & . \end{pmatrix} \begin{pmatrix} u_0 \\ u_1 \\ u_2 \\ u_3 \\ . \end{pmatrix} = \quad (21)$$

$$\begin{pmatrix} 1 & 0 & 0 & 0 & . \\ 0 & e^{i\varphi_1} & 0 & 0 & . \\ 0 & 0 & e^{i\varphi_2} & 0 & . \\ 0 & 0 & 0 & e^{i\varphi_3} & . \\ . & . & . & . & . \end{pmatrix} e^{i\Delta\theta_0} \begin{pmatrix} u_0 \\ u_1 \\ u_2 \\ u_3 \\ . \end{pmatrix} \text{ with } \varphi_i = \Delta\theta_i - \Delta\theta_0.$$

At the frequency of 0.5568, there is:

$$(u_1, u_2, u_3, u_4, .) = \begin{pmatrix} e^{\Delta\theta_0} & 0 & 0 & 0 & . \\ 0 & e^{i\Delta\theta_1} & 0 & 0 & . \\ 0 & 0 & e^{i(\Delta\theta_2+\pi)} & 0 & . \\ 0 & 0 & 0 & e^{i(\Delta\theta_3+\pi)} & . \\ . & . & . & . & . \end{pmatrix} \begin{pmatrix} u_0 \\ u_1 \\ u_2 \\ u_3 \\ . \end{pmatrix} = \qquad (22)$$

$$\begin{pmatrix} e^{\Delta\theta_0} & 0 & 0 & 0 & . \\ 0 & e^{i\Delta\theta_1} & 0 & 0 & . \\ 0 & 0 & e^{\Delta\theta_2} & 0 & . \\ 0 & 0 & 0 & e^{i\Delta\theta_3} & . \\ . & . & . & . & . \end{pmatrix} \begin{pmatrix} 1 & 0 & 0 & 0 & . \\ 0 & 1 & 0 & 0 & . \\ 0 & 0 & -1 & 0 & . \\ 0 & 0 & 0 & -1 & . \\ . & . & . & . & . \end{pmatrix} \begin{pmatrix} u_0 \\ u_1 \\ u_2 \\ u_3 \\ . \end{pmatrix} =$$

$$\begin{pmatrix} 1 & 0 & 0 & 0 & . \\ 0 & e^{i\varphi_1} & 0 & 0 & . \\ 0 & 0 & e^{i\varphi_2} & 0 & . \\ 0 & 0 & 0 & e^{i\varphi_3} & . \\ . & . & . & . & . \end{pmatrix} e^{i\Delta\theta_0} \begin{pmatrix} 1 & 0 & 0 & 0 & . \\ 0 & 1 & 0 & 0 & . \\ 0 & 0 & -1 & 0 & . \\ 0 & 0 & 0 & -1 & . \\ . & . & . & . & . \end{pmatrix} \begin{pmatrix} u_0 \\ u_1 \\ u_2 \\ u_3 \\ . \end{pmatrix}$$

The unitary transformation matrices are therefore rewritable in the form of products of quantum gates. For instance, focusing on only two kink creation operations, Eq. (21) may be reduced to:

$$(u_1, u_2, .) = \begin{pmatrix} 1 & 0 & . & . & . \\ 0 & e^{i\varphi_1} & . & . & . \\ . & . & . & . & . \\ . & . & . & . & . \\ . & . & . & . & . \end{pmatrix} e^{i\Delta\theta_0} \begin{pmatrix} u_0 \\ u_1 \\ . \\ . \\ . \end{pmatrix} \qquad (23)$$

This unitary matrix of Eq. (21) can act as a phase shift gate:

$$R_\varphi = \begin{pmatrix} 1 & 0 \\ 0 & e^{i\varphi} \end{pmatrix}.$$

The unitary matrix of Eq. (22) may be rewritten as:

$$(u_1, u_2, u_3, u_4, .) = \begin{pmatrix} e^{i\varphi'_0} & 0 & 0 & 0 & . \\ 0 & 1 & 0 & 0 & . \\ 0 & 0 & e^{i\varphi'_2} & 0 & . \\ 0 & 0 & 0 & e^{i\varphi'_3} & . \\ . & . & . & . & . \end{pmatrix} \qquad (24)$$

$$e^{i\Delta\theta_1} \begin{pmatrix} 1 & 0 & 0 & 0 & . \\ 0 & 1 & 0 & 0 & . \\ 0 & 0 & -1 & 0 & . \\ 0 & 0 & 0 & -1 & . \\ . & . & . & . & . \end{pmatrix} \begin{pmatrix} u_0 \\ u_1 \\ u_2 \\ u_3 \\ . \end{pmatrix} \text{ with } \varphi'_i = \Delta\theta_i - \Delta\theta_1.$$

or $$(., u_2, u_3, .) = \begin{pmatrix} . & . & . & . & . \\ . & 1 & 0 & 0. & . \\ . & 0 & e^{i\varphi'_2} & . & . \\ . & . & . & . & . \\ . & . & . & . & . \end{pmatrix} e^{i\Delta\theta_1} \begin{pmatrix} . & . & . & . & . \\ . & 1 & 0 & . & . \\ . & 0 & -1 & . & . \\ . & . & . & . & . \\ . & . & . & . & . \end{pmatrix} \begin{pmatrix} . \\ u_1 \\ u_2 \\ . \end{pmatrix} \qquad (25)$$

Eq. (25) involves the product of a phase shift gate and Pauli Z gate:

$$Z = \begin{pmatrix} 1 & 0 \\ 0 & -1 \end{pmatrix}.$$

While realizing the $R_\varphi$ and Z gates is useful, the possibility of realizing general unitary operations given by a matrix $$U = \begin{pmatrix} e^{\Delta\theta_0} & 0 & 0 & 0 & . \\ 0 & e^{i\Delta\theta_1} & 0 & 0 & . \\ 0 & 0 & e^{\Delta\theta_2} & 0 & . \\ 0 & 0 & 0 & e^{i\Delta\theta_3} & . \\ . & . & . & . & . \end{pmatrix}$$

creates novel opportunities for using classical elastic waves for phase-based information processing.

These gates are therefore realizable physically by considering a number of couples of parallel chains of diatomic molecules adsorbed on the surface of a cubic crystal (e.g., parallel to the (100) direction) on which one can operate by moving molecules to form the desired number of kinks.

CONCLUSIONS

Disclosed herein is an elastic model of diatomic molecules adsorbed on the (100) surface of a simple cubic crystal. It is demonstrated that the phase of elastic waves scattered by some number of adsorbed diatomic molecules depends on the particular features of the configuration of the molecules. For instance, the present disclosure considers parallel arrays of chain-like configurations of the diatomic molecules.

As disclosed herein, these parallel arrays can be further modified by creating kinks along their length. At frequencies deviating from a resonant frequency of the diatomic molecules, the phase of scattered elastic waves scales linearly with the number of kinks created. However, in the near vicinity of a resonant frequency, the phase does not scale linearly anymore but exhibits nonlinear dependency on the number of kinks.

It is also shown that near a resonant frequency, the order of creation of kinks with different symmetry affects the final value of the phase of scattered waves. This effect of the order of creation of kinks along the parallel chains can be formulated mathematically as one or more unitary matrix transformations acting on vectors in the space of elastic scattered waves.

Analogies are drawn between these phase-based elastic unitary matrices and quantum gates. An advantage of elastic unitary gates is that they are realizable physically by considering a number of couples of parallel chains of diatomic molecules adsorbed on the surface of the cubic crystal (e.g., parallel to the (100) direction) on which one can operate by moving molecules to form the desired number of kinks.

In some embodiments, displacing molecules on the surface of a crystal can be achieved using a scanning tunneling microscope.

Indeed, one may consider configurations as simple as patterns of stubs attached to the planar surface of a solid substrate. The stubs play the role of diatomic molecules as the stubs also possess a number of discrete resonant modes. A number of stubs may be arranged in configurations similar to those investigated herein, namely parallel chains of stubs or chains with kinks. The coupling between stubs is now achieved through the continuous substrate. Macroscale systems will enable the characterization of the vibrational modes and their phase using well-established techniques such as laser Doppler vibrometry.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

APPENDIX A

This Appendix presents the fits to the two-dimensional Fourier transforms of the Green's functions on the (001) surface of a simple cubic crystal (see e.g., Eq. (5) and Eq. (6)).

From Eqs. (5) and (6):

$$g_{s1}(|p_i-p_j|=0,\omega)=g_{00}$$

$$g_{s1}(|p_i-p_j|=1a,\omega)=g_{01}$$

$$g_{s1}(|p_i-p_j|=2a,\omega)=g_{02}$$

$$g_{s1}(|p_i-p_j|=\sqrt{2}a,\omega)=g_{11}$$

$$g_{s1}(|p_i-p_j|=\sqrt{5}a,\omega)=g_{12}$$

Figure 16:
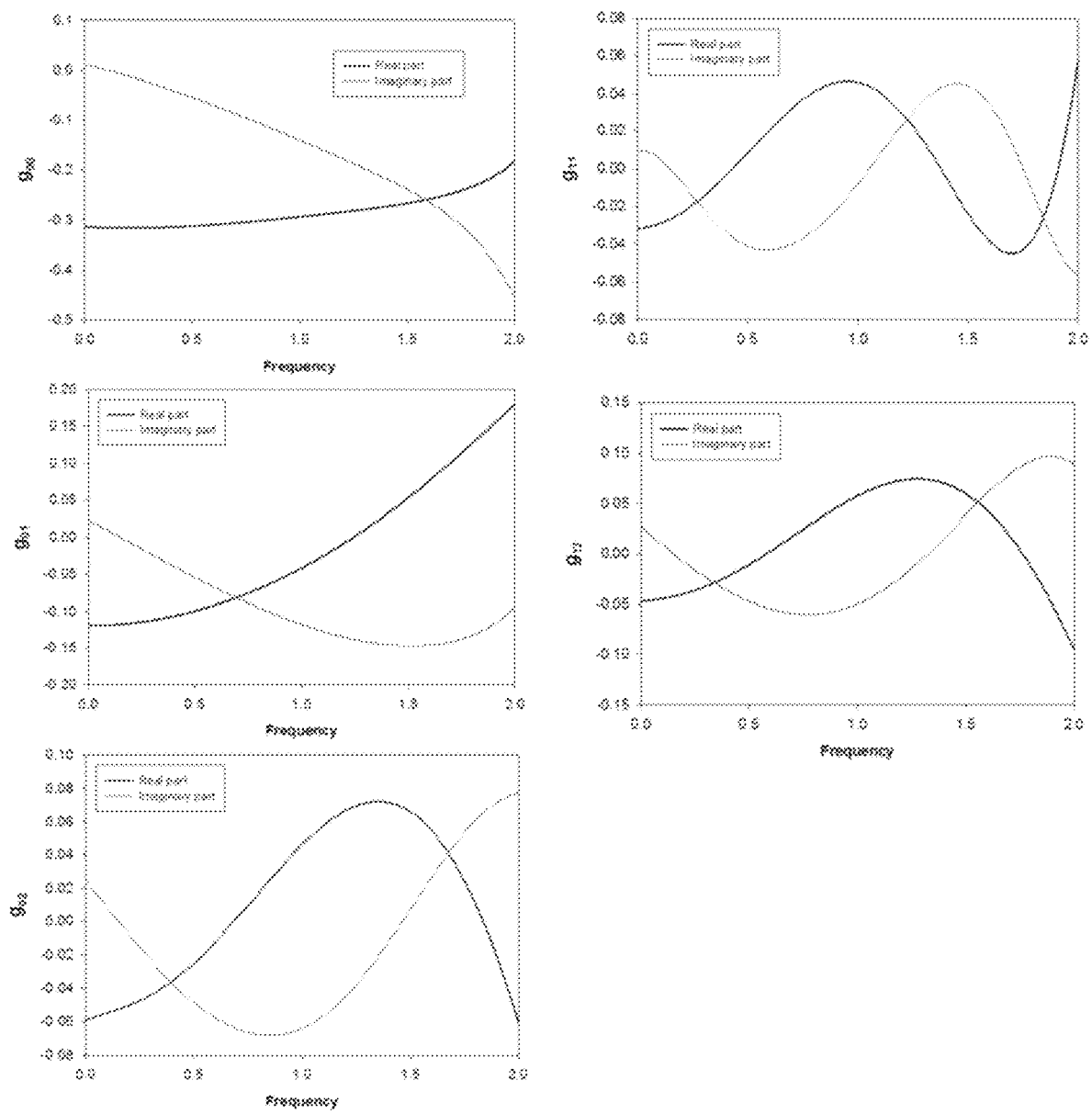
FIG. 16 illustrates fits to the numerically calculated two-dimensional Fourier transforms of the Green's functions $g_{00}$, $g_{01}$, $g_{02}$, and $g_{12}$ as functions of frequency.

FIG. 16 depicts the fits to the numerically calculated two-dimensional Fourier transforms of the five Green's functions $g_{00}$, $g_{01}$, $g_{02}$, $g_{11}$, and $g_{12}$ as functions of frequency, where the Green's functions are in units of m/β. The two-dimensional Fourier transforms are calculated for 512 values of $k_1$ and $k_2$.

The real part and imaginary parts of the functions $g_{00}$ and $g_{01}$ are given as $g_{ij}=(A_{R,I}\omega^4+B_{R,I}\omega^3+C_{R,I}\omega^2+D_{R,I}\omega+E_{R,I})e^{(F_{R,I}\omega+H_{R,I})}$ with the coefficients:

$A_R^{00}=2.411\times10^{-5}, B_R^{00}=9.376\times10^{-2}, C_R^{00}=-5.348\times10^{-1}, D_R^{00}=1.184\times10^0, E_R^{00}=-1.034\times10^0, F_R^{00}=1.202\times10^0, H_R^{00}=-1.191\times10^0$ and $A_I^{00}=-1.282\times10^{-5}, B_I^{00}=-6.859\times10^{-1}, C_I^{00}=2.854\times10^0, D_I^{00}=-3.528\times10^0, E_I^{00}=3.402\times10^{-1}, F_I^{00}=1.429\times10^0, H_I^{00}=-3.407\times10^0$ and $A_R^{01}=2.561\times10^{-1}, B_R^{01}=1.559\times10^{-1}, C_R^{01}=5.027\times10^{-1}, D_R^{01}=-6.240\times10^{-1}, E_R^{01}=-9.101\times10^{-1}, F_R^{01}=-6.644\times10^{-1}, H_R^{01}=-2.033\times10^0$ and $A_I^{01}?=4.647\times10^{-2}, B_I^{01}=-3.046\times10^{-1}, C_I^{01}=7.857\times10^{-1}, D_I^{01}=-7.979\times10^{-1}, E_I^{01}=1.025\times10^{-1}, F_I^{01}=1.128\times10^0, H_I^{01}=-1.483\times10^0$.

The real part and imaginary parts of the function $g_{02}$ are given as $$Reg_{oz} = (A_R\omega^4 + B_R\omega^3 + C_R\omega^2 + D_R\omega + E_R)e^{(F_R\omega+H_R)} \text{ and } Img_{oz} = A_I\cos(B_I\omega + C_I) + D_I\cos(E_I\omega + F_I)$$

with the coefficients:

$A_R^{02}=-1.794\times10^0, B_R^{02}=3.793\times10^0, C_R^{02}=-8.232\times10^{-1}, D_R^{02}=1.227\times10^{-1}, E_R^{02}=-5.249\times10^{-1}, F_R^{02}=-6.415\times10^{-1}, H_R^{02}=-2.180\times10^0$ and $A_I^{02}=5.675\times10^{-3}, B_I^{02}=4.733\times10^0, C_I^{02}=-3.170\times10^0, D_I^{02}=7.259\times10^{-2}, E_I^{02}=2.488\times10^0, F_I^{02}=1.136\times10^0$.

The real and imaginary parts of the functions $g_{11}$ and $g_{12}$ are given as $g_{ij}=A_{R,I}\omega^5+H_{R,I}\omega^4+C_{R,I}\omega^2+E_{R,I}\omega+F_{R,I}$ with the coefficients:

$A_R^{11}=-4.480\times10^{-2}, B_R^{11}=1.839\times10^{-1}, C_R^{11}=-2.957\times10^{-1}, D_R^{11}=2.983\times10^{-1}, E_R^{11}=-4.589\times10^{-2}, F_R^{11}=-7.422\times10^{-2}$ and $A_I^{11}=9.447\times10^{-2}, B_I^{11}=-4.220\times10^{-1}, C_I^{11}=7.380\times10^{-1}, D_I^{11}=-5.100\times10^{-1}, E_I^{11}=-6.443\times10^{-3}, F_I^{11}=9.249\times10^{-3}$ and $A_R^{12}=2.938\times10^{-2}, B_R^{12}=-1.424\times10^{-1}, C_R^{12}=1.126\times10^{-1}, D_R^{12}=8.992\times10^{-2}, E_R^{12}=1.476\times10^{-2}, F_R^{12}=-4.674\times10^{-2}$ and $A_I^{12}=-4.263\times10^{-2}, B_I^{12}=1.152\times10^{-1}, C_I^{12}=-5.344\times10^{-2}, D_I^{12}=1.013\times10^{-1}, E_I^{12}=-1.977\times10^{-1}, F_I^{12}=2.756\times10^{-2}$

What is claimed is:

1. A method comprising:
   adsorbing a plurality of diatomic molecules on a cubic crystal surface;
   creating a first pair of parallel chains, each chain of the first pair of parallel chains comprising three or more diatomic molecules; and
   displacing one or more diatomic molecules of the first pair of parallel chains to thereby create one or more kinks in the first pair of parallel chains, wherein the one or more kinks apply a first desired phase transformation to elastic waves scattered by the plurality of diatomic molecules.

2. The method of claim 1, further comprising adjusting one or more properties of the one or more kinks in the first pair of parallel chains in order to thereby apply at least a second desired phase transformation to the elastic waves scattered by the plurality of diatomic molecules.

3. The method of claim 2, wherein the one or more properties of the one or more kinks in the first pair of parallel chains include:
   a total number of kinks; and
   an order in which the kinks are created or adjusted.

4. The method of claim 3, wherein adjusting the total number of kinks in the first pair of parallel chains causes the second desired phase transformation to vary the phase of the scattered elastic waves non-linearly with the total number of kinks when the scattered elastic waves are of a frequency near a resonant frequency of the first pair of parallel chains.

5. The method of claim 3, wherein adjusting the total number of kinks in the first pair of parallel chains causes the second desired phase transformation to vary the phase of the scattered elastic waves linearly with the total number of kinks when the scattered elastic waves are not of a frequency near a resonant frequency of the first pair of parallel chains.

6. The method of claim 3, wherein the order in which the kinks are created or adjusted defines one or more unitary matrix transformations of the second desired phase transformation, wherein the one or more unitary matrix transformations act on vectors in the space of the scattered elastic waves.

7. The method of claim 1, further comprising:
creating a second pair of parallel chains, each chain of the second pair of parallel chains comprising three or more diatomic molecules that are not included in the first pair of parallel chains; and
displacing one or more diatomic molecules of the second pair of parallel chains to thereby create one or more kinks in the second pair of parallel chains, wherein the one or more kinks in the first and second pairs of parallel chains apply a third desired phase transformation to elastic waves scattered by the plurality of diatomic molecules.

8. The method of claim 7, further comprising constructing an elastic unitary gate, wherein the elastic unitary gate comprises a plurality of pairs of parallel chains, the plurality of pairs of pairs of parallel chains including at least the first pair and second pair of parallel chains.

9. The method of claim 8, further comprising performing phase-based processing with the elastic unitary gate by adjusting one or more kinks within the plurality of pairs of parallel chains.

10. The method of claim 8, wherein the elastic unitary gate is a phase shift gate applied to the scattered elastic waves.

11. The method of claim 8, wherein the elastic unitary gate is a Pauli Z gate applied to the scattered elastic waves.

12. The method of claim 1, wherein the first pair of parallel chains are arranged in the (100) direction or the (110) direction along the cubic crystal surface.

13. The method of claim 1, wherein the two constituent chains of the pair of parallel chains are separated by a distance such that no diatomic molecules of the first constituent chain interact with any diatomic molecules of the second constituent chain through the cubic crystal surface.

14. The method of claim 1, wherein displacing the one or more diatomic molecules is performed by using a scanning tunneling microscope.

15. The method of claim 1, further comprising performing a non-contact direct phase measurement of the scattered elastic waves with a laser Doppler vibrometer.

16. The method of claim 1, wherein each constituent chain of the first pair of parallel chains comprises:
a first distal diatomic molecule affixed to the cubic crystal surface;
a second distal diatomic molecule affixed to the cubic crystal surface; and
one or more intermediate distal diatomic molecules consecutively coupled between the first and second distal diatomic molecules.

17. The method of claim 16, wherein the first and second distal diatomic molecules are non-movably affixed to the cubic crystal surface such that they are not displaced to create the one or more kinks in the first pair of parallel chains.

18. The method of claim 2, wherein the second desired phase transformation comprises one or more of a variation in phase and a variation in density of states of the scattered elastic waves, and wherein the second desired phase transformation is calculated from the determinant of the elastic Green's function of the plurality of diatomic molecules adsorbed on the cubic crystal surface.

\* \* \* \* \*